US012082212B2

(12) United States Patent
Hassan Hussein et al.

(10) Patent No.: US 12,082,212 B2
(45) Date of Patent: Sep. 3, 2024

(54) RADIO RESOURCE MANAGEMENT TO ENHANCE RELIABILITY IN MOBILITY SCENARIOS

(71) Applicant: Fraunhofer-Gesellschaft zur Foerderung der angewandten Forschung e.V., Munich (DE)

(72) Inventors: Khaled Shawky Hassan Hussein, Erlangen (DE); Dariush Mohammad Soleymani, Erlangen (DE); Martin Leyh, Erlangen (DE); Shubhangi Bhadauria, Erlangen (DE); Elke Roth-Mandutz, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 318 days.

(21) Appl. No.: 17/568,457

(22) Filed: Jan. 4, 2022

(65) Prior Publication Data
US 2022/0210822 A1 Jun. 30, 2022

Related U.S. Application Data

(63) Continuation of application No. PCT/EP2019/068304, filed on Jul. 8, 2019.

(51) Int. Cl.
*H04W 72/14* (2009.01)
*H04W 28/02* (2009.01)
(Continued)

(52) U.S. Cl.
CPC ....... *H04W 72/23* (2023.01); *H04W 28/0268* (2013.01); *H04W 36/30* (2013.01); *H04W 72/044* (2013.01); *H04W 72/542* (2023.01)

(58) Field of Classification Search
CPC . H04W 28/0268; H04W 36/03; H04W 36/30; H04W 72/04; H04W 72/044;
(Continued)

(56) References Cited

U.S. PATENT DOCUMENTS

| 2001/0004374 A1* | 6/2001 | Kono | H04W 52/367 |
| | | | 375/130 |
| 2004/0038659 A1* | 2/2004 | Hirata | H03J 7/026 |
| | | | 455/257 |

(Continued)

FOREIGN PATENT DOCUMENTS

WO 2019066558 A1 4/2019

OTHER PUBLICATIONS

3GPP, "[Uploaded in 17 parts] Evolved Universal Terrestrial Radio Access (E-UTRA); User Equipment (UE) conformance specification; Radio transmission and reception; Part 1: Conformance Testing", 3GPP TS 36.521 V16.9.0, Jun. 2021, pp. 1-418.
(Continued)

*Primary Examiner* — Robert J Lopata
(74) *Attorney, Agent, or Firm* — Perkins Coie LLP; Michael A. Glenn

(57) ABSTRACT

A wireless communication system includes one or more base stations and one or more user devices, UEs, for a communication with a base station and/or another UE using allocated resources. In case the UE gets out of coverage of a serving base station, at least some of the allocated resources of the serving cell are maintained or reserved for a predefined time interval, T.

19 Claims, 6 Drawing Sheets

(51) Int. Cl.
  *H04W 36/30* (2009.01)
  *H04W 72/044* (2023.01)
  *H04W 72/23* (2023.01)
  *H04W 72/542* (2023.01)

(58) Field of Classification Search
  CPC ... H04W 72/23; H04W 72/542; H04W 76/14; H04W 76/19
  USPC .......................................................... 370/329
  See application file for complete search history.

(56) References Cited

U.S. PATENT DOCUMENTS

| | | | | |
|---|---|---|---|---|
| 2005/0007992 | A1* | 1/2005 | Phu | H04W 24/00 370/349 |
| 2011/0201279 | A1* | 8/2011 | Suzuki | H04W 24/10 455/67.11 |
| 2012/0315890 | A1* | 12/2012 | Suzuki | H04W 24/10 455/422.1 |
| 2015/0271861 | A1 | 9/2015 | Li et al. | |
| 2017/0086119 | A1* | 3/2017 | Xu | H04W 36/30 |
| 2019/0387555 | A1* | 12/2019 | Wang | H04L 41/0803 |
| 2020/0229206 | A1* | 7/2020 | Badic | H04W 28/0226 |
| 2021/0298123 | A1* | 9/2021 | Uchino | H04W 40/02 |
| 2021/0385727 | A1* | 12/2021 | Ohlsson | H04W 76/19 |
| 2022/0201779 | A1* | 6/2022 | Nakamura | H04W 40/12 |

OTHER PUBLICATIONS

3GPP, "[Uploaded in 2 parts] (RRC) protocol specification", 3GPP TS 38.331, V16.5.0, Jun. 2021, pp. 1-654.
3GPP, "[Uploaded in 2 parts] Evolved Universal Terrestrial Radio Access (E-UTRA); Physical layer procedures", 3GPP TS 36.213 V15.15.0, Sep. 2021, pp. 1-397.
3GPP, "[Uploaded in 22 parts] Protocol specification", 3GPP TS 36.331 V16.6.0, Sep. 2021, pp. 1-53.
3GPP, "[Uploaded in 3 parts] Physical layer procedures for data", 3GPP TS 38.214 V16.7.0, Sep. 2021, pp. 1-54.
3GPP, "[Uploaded in 4 parts] Physical layer of procedures for control", 3GPP TS 38.213 V16.7.0, Sep. 2021, pp. 1-60.
3GPP, "Evolved Universal Terrestrial Radio Access (E-UTRA) and Evolved Universal Terrestrial Radio Access Network (E-UTRAN) Overall description", 3GPP TS 36.300 V8.0.0, Mar. 2007, 82 pp.
3GPP, "LTE; Service requirements for V2X services", TS 122 185—V14.3.0—LTE—ETSI ("V2X sidelink in LTE (R14/A1)"), Mar. 2017, 16 pp.
3GPP, "LTE; Service requirements for V2X services", TS 122 185—V15.0.0—LTE—ETSI ("Release 15 LTE V2X"), Jul. 2018, 16 pp.
3GPP, "Medium Access Control (MAC) protocol specification", 3GPP TS 36.321 V16.6.0, Sep. 2021, 143 pp.
3GPP, "Medium Access Control (MAC) protocol specification", 3GPP TS 38.321 V16.6.0, Sep. 2021, 158 pp.
3GPP, "Multiplexing and channel coding", 3GPP TS 38.212 V16.7.0, Sep. 2021, 154 pp.
3GPP, "NR; NR and NG-RAN Overall Description; Stage 2", 3GPP TS 38.300 V16.7.9, Sep. 2021, 152 pp.
3GPP, "Overall description of Radio Access Network (RAN) aspects for Vehicle-to-everything (V2X) based on LTE and NR", 3GPP TR 37.985, V16.0.0, Jun. 2020, 35 pp.
3GPP, "Resource coordination for partial coverage", vol. RAN WG2, No. Prague, Czech Republic; Feb. 10, 2014-Feb. 14, 2014, (Feb. 9, 2014), 3GPP Draft; R2-140787 [D2D-C] Resource Coordination for Partial Coverage, 3rd Generation Partnership Project (3GPP)MOBILE Competence Centre ; 650, Route Des Lucioles ; F-06921 Sophia-Antipolis Cedex, URL: http://www.3gpp.org/ftp/Meetings_3GPP_SYNC/RAN2/Docs/, (Feb. 9, 2014), XP050792073 [X], Feb. 9, 2014, 3 pp.
Ericsson, "On Metric and Procedures for In/Out of NW coverage detection for D2D", vol. RAN WG1, No. Shenzhen, China; Mar. 31, 2014-Apr. 4, 2014, (Mar. 21, 2014), 3GPP Draft; R1-141389 Out of Coverage Procedures, 3rd Generation Partnership Project (3GPP) Mobile Competence Centre; 650, Route Des Lucioles ; F-06921 Sophia-Antipolis Cedex ; France, URL: http://www.3gpp.org/ftp/tsg_ran/WG1_RL1/TSGR1_76b/Docs/, (Mar. 21, 2014), XP050813562 [X], Apr. 2014, 6 pp.
Ericsson, "On Procedures for In/Out of NW coverage detection for D2D", vol. RAN WG1, No. Prague, CZ; Feb. 10, 2013-Feb. 14, 2013, (Jan. 31, 2014), 3GPP Draft; R1-140780 Out of Coverage Procedures_Final, 3rd Generation Partnership Project (3GPP) Mobile Competence Centre; 650, Route Des Lucioles; F-06921 Sophia-Antipolis Cedex ; France, URL: http://www.3gpp.org/ftp/tsg_ran/WG1_RL1/TSGR1_76/Docs/, (Jan. 31, 2014), XP050751735 [X], Feb. 2013, 5 pp.

\* cited by examiner

RADIO RESOURCE MANAGEMENT TO ENHANCE RELIABILITY IN MOBILITY SCENARIOS

CROSS-REFERENCE TO RELATED APPLICATION

This application is a continuation of copending International Application No. PCT/EP2019/068304, filed Jul. 8, 2019, which is incorporated herein by reference in its entirety.

TECHNICAL FIELD

The present application relates to the field of wireless communication systems or networks, more specifically to approaches for a wireless communication among entities of a wireless communication system, like a communication between base stations and user devices or between user devices. Embodiments concern enhancements for situations in which a user device is out-of-coverage a serving base station for a limited period of time.

BACKGROUND OF THE INVENTION

FIG. 1 is a schematic representation of an example of a terrestrial wireless network 100 including, as is shown in FIG. 1(a), a core network 102 and one or more radio access networks $RAN_1$, $RAN_2$, ... $RAN_N$. FIG. 1(b) is a schematic representation of an example of a radio access network $RAN_D$ that may include one or more base stations $gNB_1$ to $gNB_5$, each serving a specific area surrounding the base station schematically represented by respective cells $106_1$ to $106_5$. The base stations are provided to serve users within a cell. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the $RAN_n$ may include more or less such cells, and $RAN_n$ may also include only one base station. FIG. 1(b) shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1(b) by the arrows pointing to "core". The core network 102 may be connected to one or more external networks. Further, some or all of the respective base station $gNB_1$ to $gNB_5$ may connected, e.g. via the S1 or X2 interface or the XN interface in NR, with each other via respective backhaul links $116_1$ to $116_5$, which are schematically represented in FIG. 1(b) by the arrows pointing to "gNBs".

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and a system information block (SIB), the physical downlink, uplink and sidelink control channels (PDCCH, PUCCH, PSSCH) carrying for example the downlink control information (DCI), the uplink control information (UCI) and the sidelink control information (SCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

The wireless network or communication system depicted in FIG. 1 may by a heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like an LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs and may comprise any of the above-mentioned devices. Such devices may also communicate directly with each other (D2D communication) using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are not within one of the cells depicted in FIG. 1, rather, it means that these UEs

- may not be connected to a base station, for example, they are not in an RRC connected state, so that the UEs do not receive from the base station any sidelink resource allocation configuration or assistance, and/or
- may be connected to the base station, but, for one or more reasons, the base station may not provide sidelink resource allocation configuration or assistance for the UEs, and/or
- may be connected to the base station that may not support NR V2X services, e.g. GSM, UMTS, LTE base stations.

When considering two UEs directly communicating with each other over the sidelink, e.g. using the PC5 interface, one of the UEs may also be connected with a BS, and may relay information from the BS to the other UE via the sidelink interface. The relaying may be performed in the same frequency band (in-band-relay) or another frequency band (out-of-band relay) may be used. In the first case, communication on the Uu and on the sidelink may be decoupled using different time slots as in time division duplex, TDD, systems.

FIG. 2 is a schematic representation of an in-coverage scenario in which two UEs directly communicating with each other are both connected to a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a Mode 1 configuration in NR V2X or as a Mode 3 configuration in LTE V2X.

FIG. 3 is a schematic representation of an out-of-coverage scenario in which the UEs directly communicating with each other are either not connected to a base station, although they may be physically within a cell of a wireless communication network, or some or all of the UEs directly communicating with each other are to a base station but the base station does not provide for the SL resource allocation configuration or assistance. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a Mode 2 configuration in NR V2X or as a Mode 4 configuration in LTE V2X. As mentioned above, the scenario in FIG. 3 which is the out-of-coverage scenario does not necessarily mean that the respective Mode 2 UEs (in NR) or Mode 4 UEs (in LTE) are outside of the coverage 200 of a base station, rather, it means that the respective Mode 2 UEs (in NR) or Mode 4 UEs (in LTE) are not served by a base station, are not connected to the base station of the coverage area, or are connected to the base station but receive no SL resource allocation configuration or assistance from the base station. Thus, there may be situations in which, within the coverage area 200 shown in FIG. 2, in addition to the NR Mode 1 or LTE Mode 3 UEs 202, 204 also NR Mode 2 or LTE Mode 4 UEs 206, 208, 210 are present.

In the above-described scenarios of vehicular user devices, UEs, a plurality of such user devices may form a user device group, also referred to simply as group, and the communication within the group or among the group members may be performed via the sidelink interfaces between the user devices, like the PC5 interface. For example, the above-described scenarios using vehicular user devices may be employed in the field of the transport industry in which a plurality of vehicles being equipped with vehicular user devices may be grouped together, for example, by a remote driving application. Other use cases in which a plurality of user devices may be grouped together for a sidelink communication among each other include, for example, factory automation and electrical power distribution. In the case of factory automation, a plurality of mobile or stationary machines within a factory may be equipped with user devices and grouped together for a sidelink communication, for example for controlling the operation of the machine, like a motion control of a robot. In the case of electrical power distribution, entities within the power distribution grid may be equipped with respective user devices which, within a certain area of the system may be grouped together so as to communicate via a sidelink communication with each other so as to allow for monitoring the system and for dealing with power distribution grid failures and outages.

Naturally, in the above-mentioned use cases sidelink communication is not limited to a communication within a group. Rather, the sidelink communication may be among any of UEs, like any pair of UEs.

It is noted that the information in the above section is only for enhancing the understanding of the background of the invention and therefore it may contain information that does not form conventional technology that is already known to a person of ordinary skill in the art.

Starting from a conventional technology as described above, there may be a need for improvements or enhancements in a wireless communication among entities of a wireless communication system with regard to user devices getting into out-of-coverage for a short or medium period of time.

SUMMARY

According to an embodiment, a wireless communication system may have: one or more base stations, one or more user devices, UEs, for a communication with a base station and/or another UE using allocated resources, wherein, in case the UE gets out of coverage of a serving base station, at least some of the allocated resources of the serving cell are maintained or reserved for a predefined time interval, T, wherein the wireless communication system is to monitor a radio link between the UE and the serving base station so as to determine a short-term out-of-coverage of the UE, and wherein, responsive to determining the short-term out-of-coverage, the wireless communication system is to indicate a timer for the allocated resources, wherein the timer indicates the predefined time interval, T, as a certain time period or as a certain number of subframes.

Another embodiment may have a base station for a wireless communication system, the wireless communication system including one or more base stations and one or more user devices, UEs, for a communication with a base station and/or another UE using allocated resources, wherein, in case the UE gets out-of-coverage of the base station, the base station is to maintain or reserve at least some of the allocated resources for a predefined time interval, T, wherein a radio link between the UE and the base station is monitored so as to determine a short-term out-of-coverage of the UE, and wherein, responsive to determining the short-term out-of-coverage, the base station is to indicate to the UE a timer for the allocated resources, wherein the timer indicates the predefined time interval, T, as a certain time period or as a certain number of subframes.

Another embodiment may have a user device, UE, for a wireless communication system, the wireless communication system including one or more base stations and one or more user devices, UEs, wherein the UE is to communicate with a base station and/or another UE using allocated resources, wherein, in case the UE gets out-of-coverage of its serving base station, at least some the allocated resources of the serving base station are maintained or reserved for a predefined time interval, T, wherein a radio link between the UE and the serving base station is monitored so as to determine a short-term out-of-coverage of the UE, and wherein, responsive to determining the short-term out-of-coverage, the UE is to receive a timer for the allocated resources, wherein the timer indicates the predefined time interval, T, as a certain time period or as a certain number of subframes.

According to another embodiment, a method for operating a wireless communication system, the wireless communication system including one or more base stations and one or more user devices, UEs, for a communication with a base station and/or another UE using allocated resources, may have the steps of: in case the UE gets out-of-coverage of a serving base station, maintaining or reserving at least some of the allocated resources of the serving cell for a predefined time interval, T, monitoring a radio link between the UE and the serving base station so as to determine a short-term out-of-coverage of the UE, and responsive to determining the short-term out-of-coverage, indicating a timer for the allocated resources, wherein the timer indicates the predefined time interval, T, as a certain time period or as a certain number of subframes.

Still another embodiment may have a non-transitory computer program product having a computer-readable medium storing instructions which, when executed on a computer, perform a method for operating a wireless communication system, the wireless communication system including one or more base stations and one or more user devices, UEs, for a communication with a base station and/or another UE using allocated resources, the method having the steps of: in case the UE gets out-of-coverage of a serving base station, maintaining or reserving at least some of the allocated resources of the serving cell for a predefined time interval, T, monitoring a radio link between the UE and the serving base station so as to determine a short-term out-of-coverage of the UE, and responsive to determining the short-term out-of-coverage, indicating a timer for the allocated resources, wherein the timer indicates the predefined time interval, T, as a certain time period or as a certain number of subframes.

BRIEF DESCRIPTION OF THE DRAWINGS

Embodiments of the present invention are now described in further detail with reference to the accompanying drawings, in which.

DETAILED DESCRIPTION OF THE INVENTION

Embodiments of the present invention are now described in more detail with reference to the accompanying drawings in which the same or similar elements have the same reference signs assigned.

As mentioned above, in wireless communication systems and networks, like those described above with reference to FIG. 1, FIG. 2 or FIG. 3, a mobile device may be served by a base station, for example to receive a configuration concerning a transmission between the base station and a user device or for a communication with another user device using, for example, a sidelink. In either case, the user device is referred to as being in-coverage, as explained above with reference to FIG. 2 and FIG. 3. A user device may be a mobile device, like a vehicle or the like. Due to the mobility of the user device the connection to a base station may change while the device is moving and there may be situations in which a connection to the base station is no longer given so that the UE may go in out-of-coverage. However, in case of mobile user devices such an out-of-coverage situation may only be temporarily, i.e. may only exist for a limited period of time because as the UE is moving, a connection to the base station may be possible again.

Figure 3:
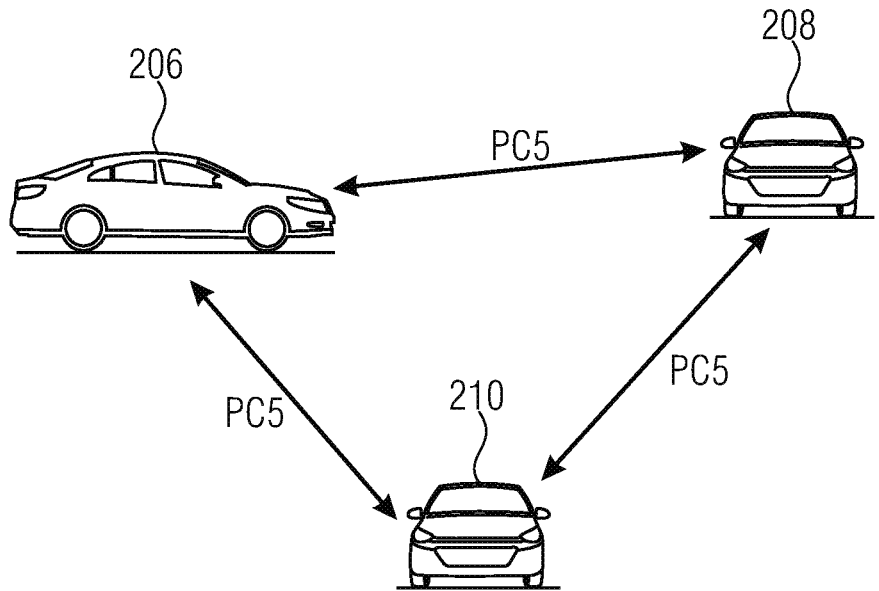
FIG. 3 is a schematic representation of an out-of-coverage scenario in which UEs directly communicating with each other receive no SL resource allocation configuration or assistance from a base station.
Figure 4:
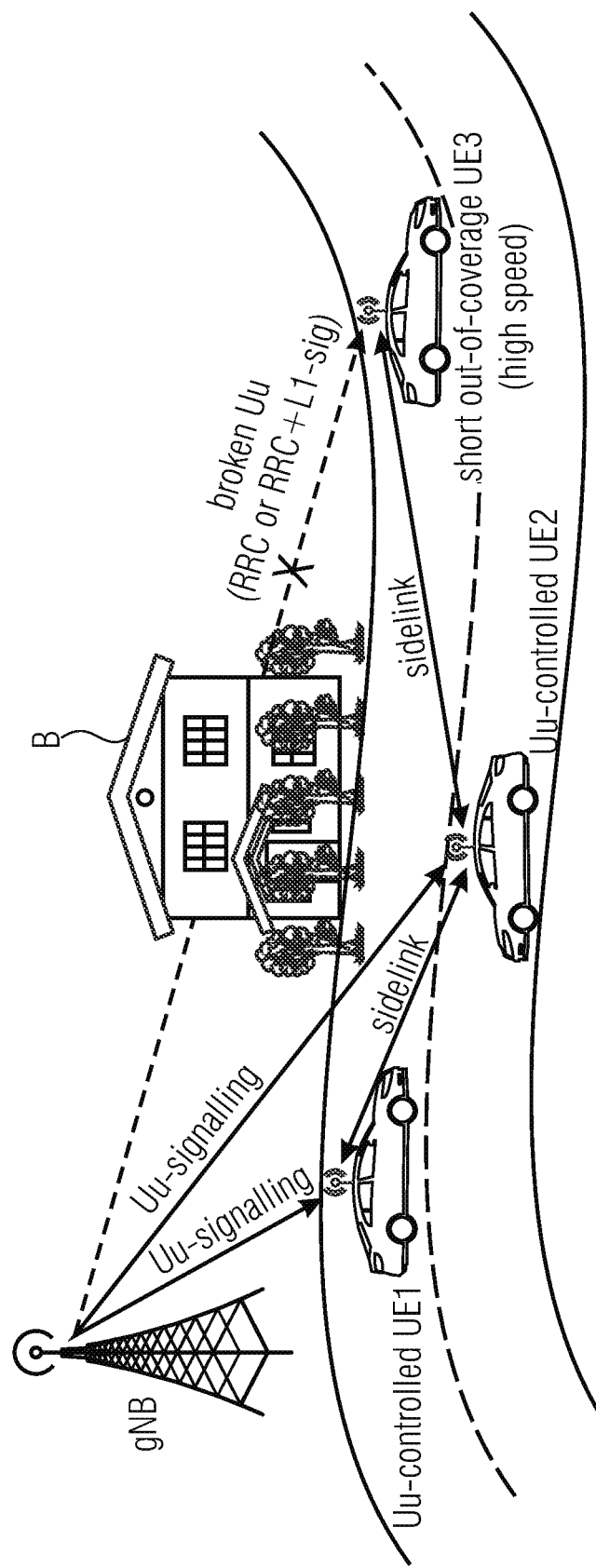
FIG. 4 schematically illustrates a scenario of a mobile UE temporarily getting into out-of-coverage.

FIG. 4 illustrates an out-of-coverage situation for a highway scenario. FIG. 4, schematically, illustrates a cell, as for example a cell mentioned above with reference to FIG. 1, FIG. 2 or FIG. 3 including a base station gNB serving a plurality of mobile UEs, in the depicted example respective vehicles UE1, UE2 and UE3 are assumed to travel along a highway and are served by the gNB. The respective UEs are Uu controlled by the base station gNB and are in-coverage, i.e. are operated in Mode 1. However, as the respective UEs travel along the highway there may be obstacles, like the building B blocking a connection between the gNB and a UE. In the example of FIG. 4, UE3 is at a position in which the connection to the gNB is no longer possible because of the obstacle B. The Uu signaling providing, for example, the respective resources by RRC or RRC+L1 signaling to be used for the communication either to the base station or over the sidelink is no longer given. Thus, UE3 may be considered to be out-of-coverage, however, because UE3 is traveling, for example with a high speed along the highway, the obstacle B blocks the connection to the gNB only for a short period, and as soon as the vehicle passed the obstacle B the connection to the base station gNB is possible again so that the UE3 is then in-coverage again.

However, in case of a UE being out-of-coverage in NR-V2X communications, similar to LTE-V2X communications, the RRC configuration for UE3 are overwritten by a pre-configuration if UE3 is out-of-coverage on all frequencies in the supported frequency list, i.e., in case UE3 switches to Mode 2. The RRC configuration may include configured grants, CGs, which may also no longer be available. As mentioned above, typical reasons for a UE to go in out-of-coverage for a short time are, for example, due to channel fading in the presence of obstacles, like tunnels or buildings. Such a situation has an impact on an ongoing unicast communication because the communication continuity between the communication entities using the sidelink may no longer guaranteed. Also in case of a group-cast communication, if one or more group members go in out-of-coverage for a short time communication, continuity between respective group members over the sidelink may no longer be guaranteed. Other problems associated with a scenario in which a user device, like a vehicle, it is out-of-coverage for a short or medium time period, i.e., in case the UE loses connection to its serving cell or serving base station, is that for example a handover may not be possible or may be unsuccessful because one or more neighboring cells or base stations may be missed so that the handover took longer than expected and, as a consequence, a radio link failure, RLF, procedure is initiated. However, as the vehicle may move along a cell edge or because the obstacles leading to the radio link failure are passed by the vehicle quickly, the vehicle may return into coverage within a very short time period, for example within milliseconds.

The present invention provides improvements or enhancements in a wireless communication among entities of a wireless communication system addressing the above problems or issues with regard to user devices getting into out-of-coverage only for a short or medium period of time.

Figure 1A:
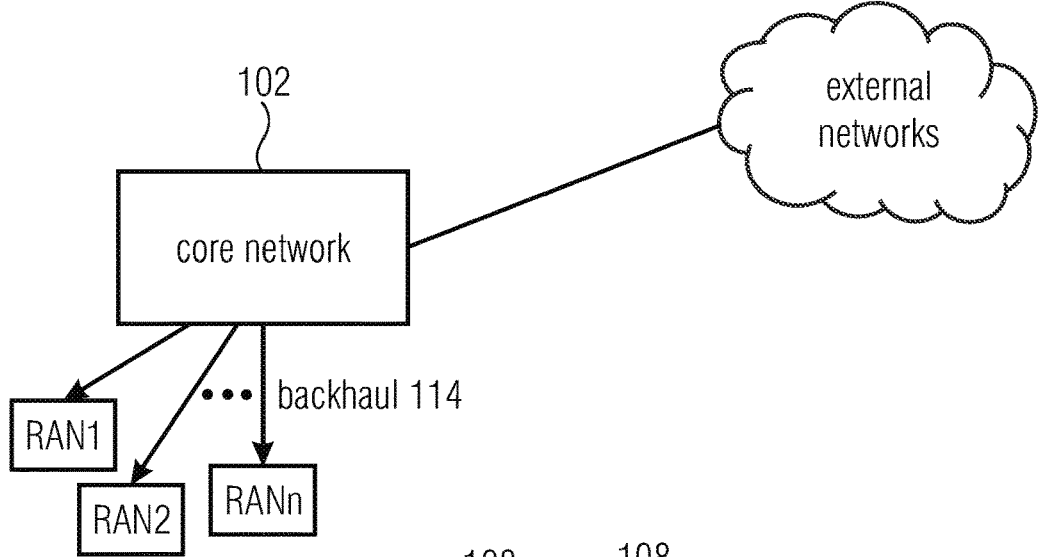
FIGS. 1a-b show a schematic representation of an example of a wireless communication system.
Figure 1B:
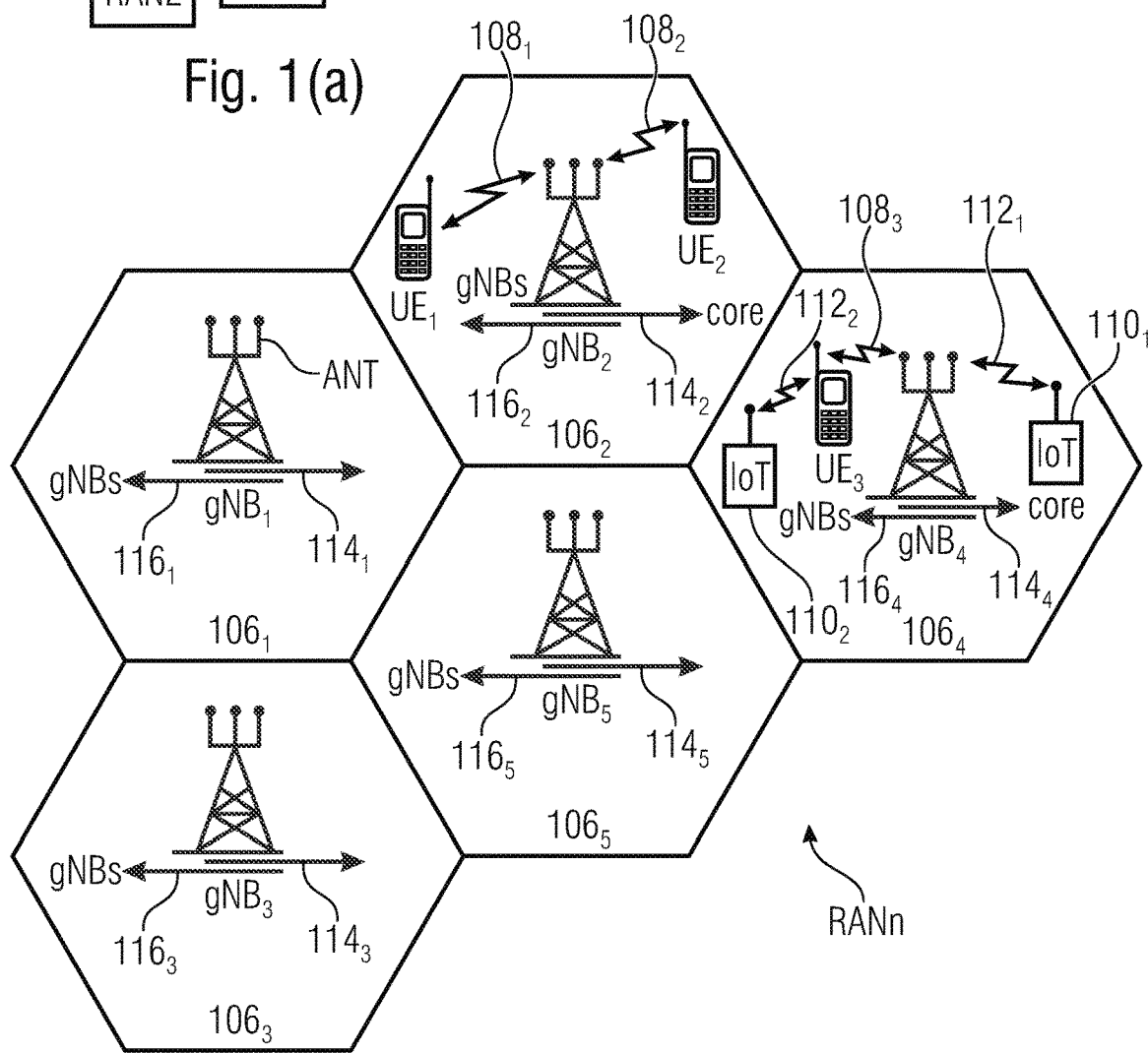
Figure 2:
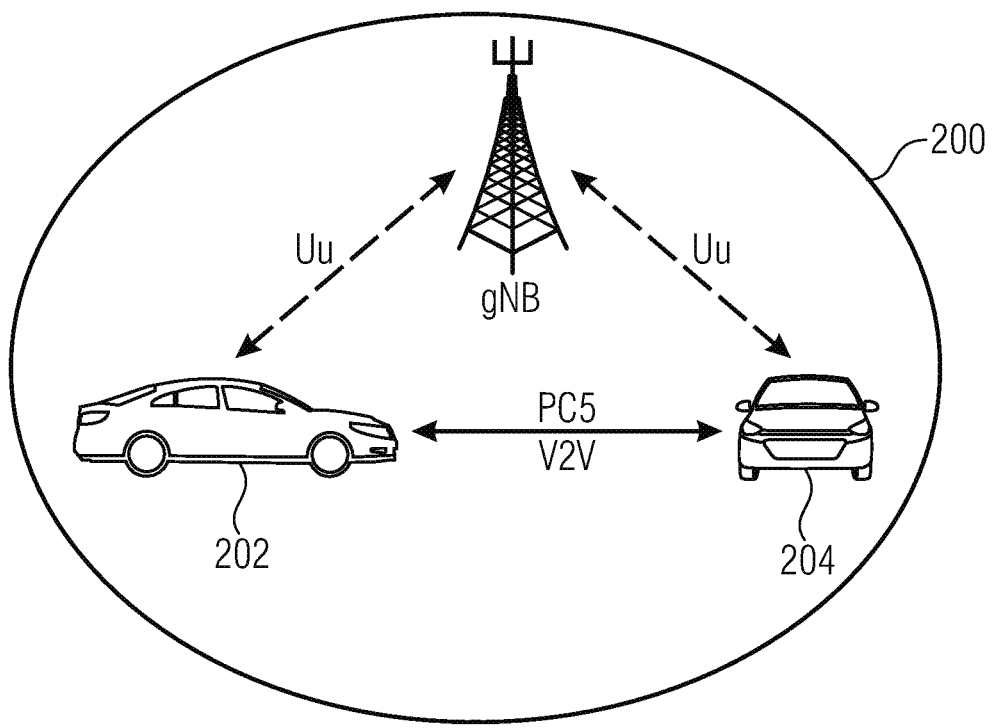
FIG. 2 is a schematic representation of an in-coverage scenario in which UEs directly communicating with each other are connected to a base station.
Figure 5:
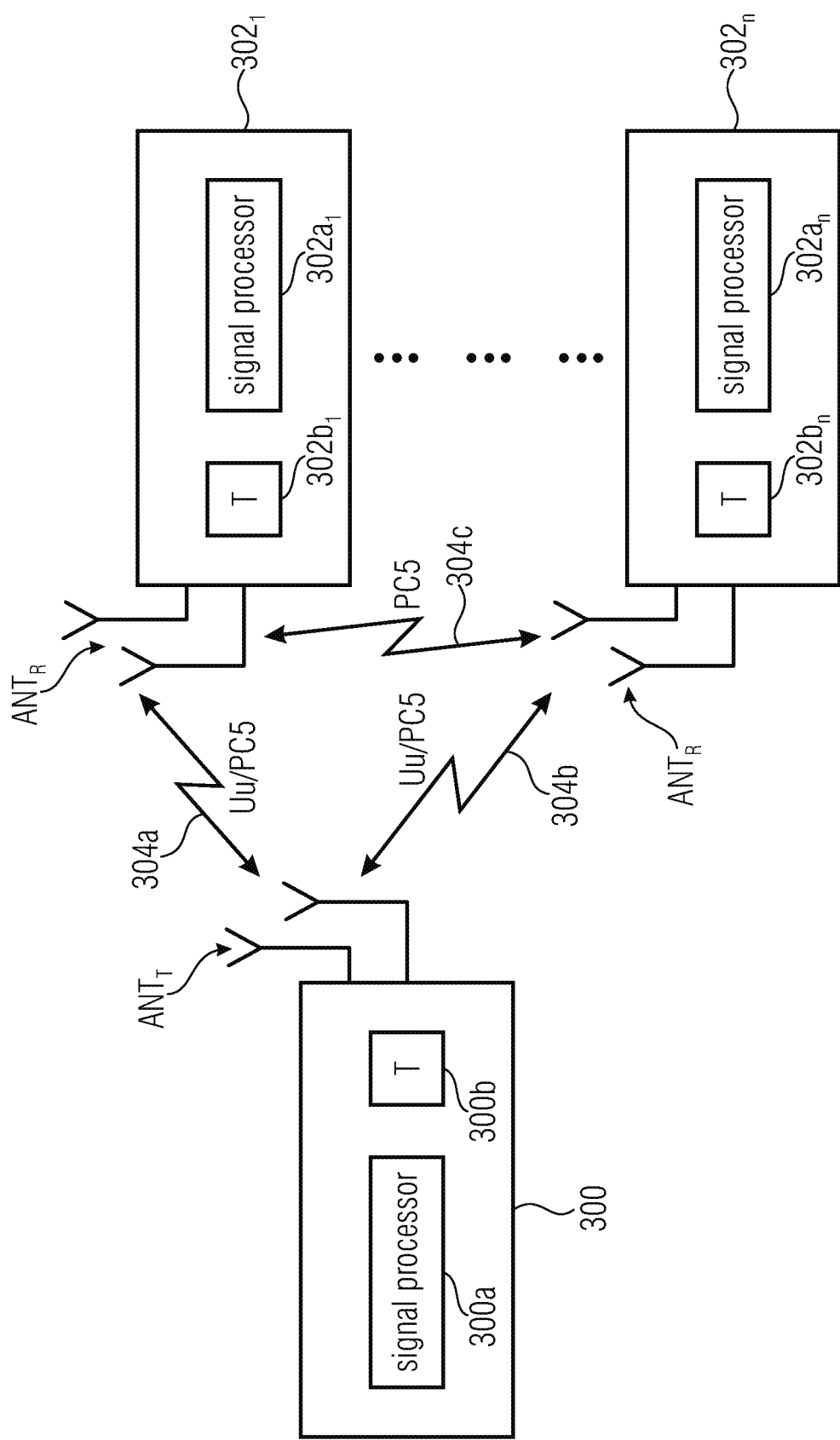
FIG. 5 is a schematic representation of a wireless communication system including a transmitter, like a base station, and one or more receivers, like user devices, UEs.

Embodiments of the present invention may be implemented in a wireless communication system as depicted in FIG. 1, FIG. 2, and FIG. 3 including base stations and users, like mobile terminals or IoT devices. FIG. 5 is a schematic representation of a wireless communication system including a transmitter 300, like a base station, and one or more receivers 3021 to 302n, like user devices, UEs. The transmitter 300 and the receivers 302 may communicate via one or more wireless communication links or channels 304a, 304b, 304c, like a radio link. The transmitter 300 may include one or more antennas $ANT_T$ or an antenna array having a plurality of antenna elements, a signal processor 300a and a transceiver 300b, coupled with each other. The receivers 302 include one or more antennas $ANT_R$ or an antenna array having a plurality of antennas, a signal processor $302a_1$, $302a_n$, and a transceiver $302b_1$, $302b_n$ coupled with each other. The base station 300 and the UEs 302 may communicate via respective first wireless communication links 304a and 304b, like a radio link using the Uu interface, while the UEs 302 may communicate with each other via a second wireless communication link 304c, like a radio link using the PC5 interface. The UEs may communicate with each other over the sidelink. The system, the one or more UEs 302 and the base stations may operate in accordance with the inventive teachings described herein.

Wireless Communication System

The present invention provides a wireless communication system, comprising one or more base stations, and one or more user devices, UEs, for a communication with a base station and/or another UE using allocated resources, wherein, in case the UE gets out of coverage of a serving base station, at least some of the allocated resources of the serving cell are maintained or reserved for a predefined time interval, T.

In accordance with embodiments, at least some of the allocated resources comprise SL resources, wherein one or more of the following SL resources allocations may be maintained or reserved:
  resource pool definitions, or
  configured resources, or
  other RRC configurations.

In accordance with embodiments, the wireless communication system is to monitor a radio link between a UE and a serving base station so as to determine a short-term out-of-coverage of the UE, wherein the monitoring may include one or more of the following measurements:
  out-of-sync,
  signal strength, like RSSI,
  CR errors or Block-Error rate,
  radio link fading or failure metrics or measures.

In accordance with embodiments, the short-term out-of-coverage is identified in case one or more of the measurement results from the monitoring of the radio link is below a predefined respective threshold, and wherein the respective thresholds may depend on the communication the UE is involved in, e.g., certain requirements to be fulfilled, like a certain quality of service, QoS, including for example latency, reliability, and communication range, or a certain casting type, including for example unicast, multicast or broadcast, or a certain communication type, including for example an initial transmission, a retransmission and a feedback, like HARQ or CSI.

In accordance with embodiments, responsive to determining the short-term out-of-coverage the wireless communication system is to indicate a timer, for example a configured grant timer, for the allocated resources, wherein the timer may indicate the predefined time interval, T, as a certain time period or as a certain number of subframes, wherein the timer may defined based on:
  a single fixed value configured via signaling or preconfigured in a UE or by a network
  more than one value configured via signaling or preconfigured in a UE or by a network
  one or more values configured via upper layer signaling, wherein the values convey one or more Quality of Services, QoS, indicator one or more values measured by the UE, wherein the UE may be requested to perform timing measurements, wherein the timing measurements may imply the different criteria, e.g., speed, route-direction, position, packet priority, QoS In accordance with embodiments, the timer is provided for a specific UE or for a group of UEs.

In accordance with embodiments, the predefined time interval, T, of the timer is selected to
- avoid the UE being considered out-of-coverage, e.g., by upper layers, immediately responsive to determining the short-term out-of-coverage, thereby avoiding a dumping of the allocated resources, and/or
- allow the UE to complete a handover procedure, and/or
- allow the UE to stay connected while performing Handover or when a HO stays for a timer (longer timer) not successful.

In accordance with embodiments, the timer is terminated before the predefined time interval, T, is reached responsive to the UE
- joining a new cell/base station and receiving a RRC configuration from the new cell/base station, e.g., responsive to a successful handover, or
- joining back to the serving cell/base station and receiving a RRC reconfiguration.

In accordance with embodiments, the wireless communication system is to start the timer responsive to one or more of the following:
- an out-of-coverage determination in the serving cell frequency list,
- an out-of-coverage determination in a neighboring cell list,
- the UE initiating a UE assisted handover,
- the UE started a base station assisted handover, and
- the UE being in Mode 2 and determining that no sensing results are available.
- the UE being in Mode 1 and changing to Mode 2.

In accordance with embodiments, in case the timer is indicated to the UE so as to maintain RRC/configurations during the short-term out-of-coverage,
- if the timer is for out-of-coverage, then the timer may be longer than RLF,
- if the UE is doing Handover, then the timer may be longer than HO timers.

In accordance with embodiments, in case of the UE switching from Mode 1 to Mode 2 due to a Radio Link Failure, RLF, the timer starts prior to the RLF and continues beyond the RLF.

In accordance with embodiments, the allocated resources are resources for configured grants, wherein the configured grants may include RRC configured grants without any L1 signaling, RRC Type 1, or RRC configured grants with an L1 signaling for activation or deactivation, RRC Type 2.

In accordance with embodiments,
the configured grants comprise one or more of the following:
- configured grants for TX resource pools used for specific UEs,
- common configured grant resources used by a group UEs, configured with a group common signaling
- common configured grant resources used by all UEs, or
- the configured grant resources may be configured via RRC and/or DCI signaling to be operating in:
  - exceptional pools used during radio failure and other radio exceptional conditions,
  - UL resources if the UE is allowed to perform SL communication over Uu configured resources,
  - X/flexible/S resources or slots if the UE is allowed to perform SL communication over Uu configured resources,
  - DL resources if the UE is allowed to perform SL communication over Uu configured resources,
  - SPS configuration configured to UE by an LTE device.

In accordance with embodiments, for a transmission on the configured grants during the predefined time interval, T, the timer is to preserve a periodicity P of one or more configured grants.

In accordance with embodiments, the timer is to preserve the periodicity P by referring to one or more of the following:
- only the configured time-offset synchronized to last detected SFN,
- the configured time-offset and a correction from a GNSS, from source UE(s) or from another cell, and
- if indicated by an RRC messages or an upper layer, an arbitrary selected time-offset to an arbitrary selected SFN, wherein the UE is to send an appropriate PSSS as a synchronization source for the serving base station.

In accordance with embodiments, for a transmission on the configured grants during the predefined time interval, T, a time domain resources periodicity P is to be reset to:
- an original periodicity P allocated by the base station via RRC and/or DCI before the short-term out-of-coverage,
- a new periodicity P_new faster than an original periodicity P allocated by the base station via RRC and/or DCI before the short-term out-of-coverage, for example such that P_new=P/2; or P_new=P/3, or P_new=P/4, . . . , or P_new=P/N, where N is an integer,
- a new periodicity P_new slower than an original periodicity P allocated by the base station via RRC and/or DCI before the short-term out-of-coverage, for example such that P_new=2P; or P_new=3P, or P_new=4P, . . . , or P_new=N times P, where N is an integer.

In accordance with embodiments, for a transmission on the configured grants during the predefined time interval, T, the frequency domain resources are to be reset to:
- an original frequency domain allocation allocated for an in coverage situation,
- an short-term out-of-coverage frequency domain allocation, the short-term out-of-coverage frequency domain allocation comprising
  - an allocation of 100% of the original resources in frequency allocated via RRC or DCI before the short-term out-of-coverage, or
  - an allocation of X % of the original resources in frequency allocated via RRC or DCI before the short-term out-of-coverage, where X may be an arbitrary value between 0 and 100, and where X may be configured by upper/higher layers signaling or may be pre-configured in the UE or selected by the UE higher layers, wherein resources may be allocated from a lower PRB/VRB/Sub-channel or from a higher PRB/VRB/Sub-channel.

In accordance with embodiments, for a transmission on the configured grants during the predefined time interval, T, operational frequency domain and/or time domain hopping is configured, wherein the UE may be configured or pre-configured to perform the hopping with a certain resource pattern.

In accordance with embodiments, time hopping is configured by defining a time hopping sequence via a shift from a predefined transmission periodicity P as follows:

at a transmission instance T(n), a transmission is performed at T(n)=T_from_last_TX+P, at a transmission instance T(n+1), a transmission is performed at T(n+1)=T_from_last_TX+P+deltashift1, at a transmission instance T(n+2), a transmission is performed at T(n+2)=T_from_last_TX+P+deltashift2,

. . . , at a transmission instance T(n+M), a transmission is performed at T(n+M)=T_from_last_TX+P+deltashiftM, at T(mod(N,M+1)), with n=N transmission instance, M+1=end of shift counting, a transmission is performed at T(mod(N,M+1))=T_from_last_TX+P, wherein deltashiftX is the shift from P, either positive or negative, to generate a time hopping.

In accordance with embodiments, an inter-slot or an intra-slot frequency hopping is configured as follows:

by defining a hopping sequence within one configured grant resources within a time-slot and resource blocks, RB, and/or by defining a hopping sequence among frequencies configured to one or more other configured grants, and/or by defining a hopping sequence among frequencies granted to one or more other granted resources, wherein the UE may be requested, e.g., via RRC messages or inside the configured grants information elements, to perform the hopping with a certain pattern and/or sequence in time and/or frequency, and/or where the UE may be requested, e.g., via RRC messages or inside the configured grants information elements or preconfigured in the UE or by upper-layers, to perform a random hopping in time and/or frequency.

In accordance with embodiments, a frequency and time hopping is configured by defining and signaling or by preconfiguring and indexing or by preconfiguring and enabling one or more time/frequency resource pattern as TFRP, wherein the UE may be requested, e.g., via RRC messages, to sense each TFRP, or the UE may be requested to change one or more TX parameters, e.g., reduce power and/or MCS, if one TFRP is used and sensing results is showing high chance of collision.

In accordance with embodiments, the wireless communication system is to initialize a DMRS sequence for the predefined time interval, T.

In accordance with embodiments, wherein the DMRS sequence for the predefined time interval, T, is initialized using:

a DMRS sequence initialized by the serving base station, e.g., via RRC/DCI configured grants, and/or a preconfigured sequence, and/or a randomly selected UE, e.g., identified by upper layers, to cover DMRS sequence generation during the short-term out-of-coverage.

In accordance with embodiments, a DMRS position is hopping in time and frequency, e.g., by identifying hopping DMRS symbol positions and different OFDM Resource Element Locations In accordance with embodiments, a DMRS sequences randomization is selected by the UE to avoid DMRS collision if more than a pair of UEs are in the short-term out-of-coverage selecting from similar resources.

In accordance with embodiments, the wireless communication system is to provide an exceptional set of resources and to cause switching to the exceptional set of resources once the UE or the base station identifies an short-term out-of-coverage and the predefined time interval, T, expired.

In accordance with embodiments, the exceptional set of resources comprises an exceptional pool including time and frequency resources, wherein the time and frequency resources may be split into:

time frequency patterns, wherein the UE is to perform sensing on all the different time frequency patterns, after which the UE selects one or more patterns for transmission, or time frequency patterns, wherein the UE is to perform sensing on dedicated ones of the time frequency patterns, or time frequency patterns, where a UE is to use a dedicated time frequency pattern, which may be identified by a specific RRC signaling, or by a specific DCI signaling, or by a group common RRC signaling, or by a group common PDCCH/DCI signaling, In accordance with embodiments, the exceptional set of resources comprises an exceptional pool including time and frequency resources, wherein the exceptional pool includes one or more configured grants, wherein the exceptional pool including the one or more configured grants may be used when a channel shows high congestion values, like high Channel Busy Ratios (CBR), or high data traffic loads, like a high number of scheduling requests (SR) or buffer status reports (BSR), and wherein the UE may be requested to select among all configured grants, and/or among configured grants, e.g., up to 8 or more configurations, in time with time offset and periodicity P but with same frequency, and/or among configured grants, e.g., up to 8 or more configurations, in frequency with different subchannels/subbands/RB-frequency offset but with same time offsets and periodicity P, and/or among configured grants, e.g., up to 8 or more configurations, in both frequency with different subchannels/subbands/RB-frequency offset and time with time offset and periodicity, and/or only 1 configuration which is indicated by a specific RRC signaling, or by a specific DCI signaling, or by a group common RRC signaling for a group of UEs, or by a group common PDCCH/DCI signaling for a group of UEs.

In accordance with embodiments, the exceptional set of resources comprises an exceptional pool including time and frequency resources configured as configured grants.

In accordance with embodiments, the exceptional set of resources comprises a set a fixed configured grants or configured grants with multiple ConfiguredGrantConfig messages or only with an rrc-ConfiguredUplinkGrant message or rrc-ConfiguredSidelinkGrant message, wherein the said configured grants information may carry exceptional timers that allows operation outside coverage.

In accordance with embodiments, the exceptional set of resources comprises exceptional configured grants, for example RRC messages only or UE specific/group-specific RRC and/or DCI messages.

In accordance with embodiments, the exceptional configured grants are configured in time/frequency with, e.g., (exceptional)-ConfiguredGrantConfig messages or only an (exceptional)-rrc-ConfiguredUplinkGrant message.

In accordance with embodiments, the exceptional configurations are selected by the UE and may be used during in coverage and during out of coverage until the timer expired once or multiple times.

In accordance with embodiments, the timers of the exceptional pool may define how long the exceptional resource pool is used during out-of-coverage, when out-of-coverage is triggered.

In accordance with embodiments, the timers of the configured grants defined within an exceptional pool, if timers are defined, may be overwritten by exceptional resource pools timers if present.

In accordance with embodiments, during a handover procedure, the UE is to use the configured grants in the exceptional pool of the target cell or of the serving cell.

In accordance with embodiments, the UE is to use the configured grants in the exceptional pool when being out-of-coverage for longer than the predefined time interval, T.

In accordance with embodiments, when the UE moves from a NR cell to a LTE cell and the UE triggers a SoC timer, the UE keeps the configured grant, e.g., type 1, granted from the Secondary NR cell until the timer of SoC is running, and once the timer has expired then the UE starts using the SPS configuration provided by the LTE cell, wherein, via the X2 Interface, the LTE cell is made aware of the CG Type 1 configuration granted previously, and when the UE moves from the LTE Cell to the NR cell, via the X2 interface, the NR cell and the LTE cell are aligned with regard to the SPS configuration granted to the UE, for example by storing in the UE the configuration of the SPS and providing it as a UE capability info to the NR cell.

In accordance with embodiments, exceptional configured grants provided in exceptional pools or common TX pools may be employed for a handover between different RATs, and the UE may be configured by a NR serving cell and move to an LTE target cell or vice versa, and a CG may be defined to be used in the target cell (e.g., including NR Type 1 like CG, NR Type 2 like CG with some limitation for LTE operation, or LTE like SPS) and may be used during handover, inside:
  an exceptional pool of the T-Cell or target cell (and T-Cell frequencies) or the S-Cell or serving cell (and S-Cell frequencies), or
  a TX pool of the T-Cell (and T-Cell frequencies) or the S-Cell (and S-Cell frequencies).

In accordance with embodiments, exceptional configured grants provided in exceptional pools or common TX pools may be employed for a handover between different RATs, and the UE may be configured by a LTE serving cell and move to a NR LTE target cell, and a resource configuration may be defined to be used in the target cell, e.g., as an SPS configuration, and may be used during handover, inside:
  an exceptional pool of the T-Cell or target cell (and T-Cell frequencies) or the S-Cell or serving cell (and S-Cell frequencies), or
  a TX pool of the T-Cell (and T-Cell frequencies) or the S-Cell (and S-Cell frequencies).

In accordance with embodiments, the set of sidelink resources and/or the subset set of sidelink resources comprises a plurality of contiguous or non-contiguous resources across a frequency domain and adjacent or non-adjacent across a time domain.

In accordance with embodiments, the set of sidelink resources defines one or more of a resource pool (RP), a mini-resource pool (mRP) or a group common resource pool, a band width part, BWP, in a resource pool, a resource pool in a BWP.

In accordance with embodiments, the plurality of UEs comprise one or more of a mobile terminal, or stationary terminal, or cellular IoT-UE, or vehicular UE, or a group leader UE (GL), or an IoT or narrowband IoT, NB-IoT, device, or a ground based vehicle, or an aerial vehicle, or a drone, or a moving base station, or road side unit (RSU), or a building, or any other item or device provided with network connectivity enabling the item/device to communicate using the wireless communication network, e.g., a sensor or actuator.

In accordance with embodiments, the base station comprises one or more of a macro cell base station, or a small cell base station, or a central unit of a base station, or a distributed unit of a base station, or a road side unit, or a UE, or a scheduler UE, a group leader (GL), group head (GH), a cluster head (CH) or a relay or a remote radio head, or an AMF, or an SMF, or a core network entity, or mobile edge computing entity, or a network slice as in the NR or 5G core context, or any transmission/reception point, TRP, enabling an item or a device to communicate using the wireless communication network, the item or device being provided with network connectivity to communicate using the wireless communication network.

Base Station

The present invention provides a base station for the inventive wireless communication system.

The present invention provides a base station for a wireless communication system, the wireless communication system including one or more base stations and one or more user devices, UEs, for a communication with a base station and/or another UE using allocated resources, wherein, in case the UE gets out-of-coverage of the base station, the base station is to maintain or reserve at least some of the allocated resources for a predefined time interval, T.

User Device

The present invention provides a user device, UE, for the inventive wireless communication system.

The present invention provides a user device, UE, for a wireless communication system, the wireless communication system including one or more base stations and one or more user devices, UEs, wherein the UE is to communicate with a base station and/or another UE using allocated resources, and wherein, in case the UE gets out-of-coverage of its serving base station, at least some the allocated resources of the serving base station are maintained or reserved for a predefined time interval, T.

Method

The present invention provides a method for operating the inventive wireless communication system.

The present invention provides a method for operating a wireless communication system, the wireless communication system including one or more base stations and one or more user devices, UEs, for a communication with a base station and/or another UE using allocated resources, the method comprising, in case the UE gets out-of-coverage of a serving base station, maintaining or reserving at least some of the allocated resources of the serving cell for a predefined time interval, T.

Computer Program Product

The present invention provides a computer program product comprising instructions which, when the program is executed by a computer, causes the computer to carry out one or more methods in accordance with the present invention.

Thus, in accordance with embodiments of the present invention, which are described in more detail below, situations in which a UE, like a vehicle or another mobile UE, may switch to Mode 2 for a short or medium period of time are addressed. For example, to guarantee communication continuity between group members and/or between unicast communication members on sidelinks embodiments of the present invention provide scheduling enhancements. Other embodiments allow easily resuming communication with the base station once a connection between the UE and the base station is possible again (this applies for a situation in which a UE performs a SL communication to another UE as well as for a situation in which the does not UE perform a SL communication, I.e., independent of whether a SL communication is performed or not). Embodiments of the present invention reduce latency issues and improve reliability and, at the same time, may avoid signaling overhead. According to embodiments of the present invention, the above is achieved by maintaining or reserving for a short time interval at least some of the resources, for example sidelink resources, which were previously allocated, i.e., before the UE went to out-of-coverage. In case of a SL resources allocation, one or more resource pool definition or other RRC configurations may be maintained without announcing a complete service or coverage failure. The SL resources to be maintained may include configured grants, CGs, of a TX pool of a last serving cell or base station. This allows the UE that temporarily lost connection to the base station, i.e., is out-of-coverage for a short period of time, continue to communicate over the sidelink with one or more other UEs using the maintained SL resources. Also, in case resources for a communication with the base station are reserved, the UE may immediately reuse the former resources once the UE returns into coverage of the previous serving cell without an interruption and without the need for additional signaling exchange. The above-mentioned situation of a UE being out-of-coverage for a short or medium period of time is referred to in the following also as short out-of-coverage or short OoC.

In accordance with embodiments, a radio link between a UE and a serving base station may be monitored so as to determine an out-of-coverage, OoC, situation or short-term out-of-coverage, e.g., based on one or more of the following measurements:
  out-of-sync,
  signal strength, like RSSI,
  CR errors or Block-Error rate,
  radio link fading or failure metrics or measures.

For example, further to or instead of the situations described above with reference to FIG. 3, in accordance with embodiments, an out-of-coverage, OoC, situation may be identified in case one or more of the measurement results from the monitoring of the radio link is below a predefined respective threshold. The respective thresholds may depend on
  the communication the UE is involved in, e.g., certain requirements to be fulfilled, like a certain quality of service, QoS, including for example latency, reliability, and communication range, or
  a certain casting type, including for example unicast, multicast or broadcast, or
  a certain communication type, including for example an initial transmission, a retransmission and a feedback, like HARQ or CSI.

In accordance with embodiments, preserving or maintaining at least some of the previously allocated resources may include maintaining or preserving an RRC configured grant configuration for the SL so as to preserve and purse the configured grants (grant-free) in both the RRC type 1 and the RRC type 2 configured grants during the situation in which the user device is temporarily out-of-coverage of a radio signal or radio link to the base station becomes weak, i.e., falls short of a predetermined threshold.

In accordance with further embodiments, during short OoC the resources reserved and/or reference signals may be randomized, i.e., a UE may perform randomization so as to reduce interference. The randomization may be achieved by frequency and/or time hopping.

In accordance with further embodiments the base station or the network may configure a UE with specific resources to overcome the short out-of-coverage moments to maintain the SL communication using configured grants when the UE moves in and out-of-coverage for a short time. The above-mentioned specific resources to be used by the UE for the short out-of-coverage moments may be resources from a common resource pool. The common resource pool may be an enhanced version of the Release-15 exceptional pool, so as to mitigate the short out-of-coverage scenario. In accordance with embodiments, the specific resources to be used by the UE for the short-of-coverage moments may comprise an exceptional pool to be used based on an OoC timer defining a predefined period of time after the UE switched into Mode 2, i.e., went into out-of-coverage. In the exceptional pool one or more configured grants may be defined. In accordance with other embodiments, rather than providing an exceptional pool, exceptional configured grants may be configured in one or more certain TX pools.

Embodiments of the present invention are advantageous as they provide for a communication continuity on the SL in case of short out-of-coverage moments of a UE. Further, toggling or switching between Mode 1 and Mode 2 may be avoided. Further, embodiments avoid a UE running quickly into a radio link failure, for example during handover. Further, the inventive approach allows maintaining the communication in accordance with the Mode 1 operation for brief or short out-of-coverage moments of a UE, also referred as a quasi-out-of-coverage situation. Further embodiments may configure durable common resource pools, like the Release-1 exceptional pools, for NR sidelink transmissions.

Embodiments of the present invention are described in more detail, followed by examples or use cases employing the respective embodiments of the present invention.

For the subsequent description it is assumed that a UE may be configured for a communication with a base station using the Uu interface or with one or more other UEs using a sidelink interface. The UE is considered to be in-coverage so as to be Uu-controlled for receiving a configuration of the respective resources to be used for the communication via the Uu interface. The base station may be an NR base station, like a gNB, or an LTE base station, like an eNB.

In accordance with embodiments of the present invention, some or all of the resources, for example SL resources, which have been allocated to be used by a UE which is in-coverage, may be maintained or preserved for a limited period of time after it has been determined that the UE went into out-of-coverage. For example, an RRC configured grant configuration for a SL communication may be preserved. However, also other resources may be preserved so as to allow the UE to immediately reconnect to the bases station after the temporary OoC moment.

Embodiments of the invention may be employed, e.g., in a V2X, D2D, mMTC, URLLC, critical communication, or in a high traffic scenario for V2X, with some/few/single UEs transmitting on the same/multiple pools. The RX UE may have one or more RF chains.

Embodiment 1

In accordance with a first embodiment a RRC configured grant configuration for a SL communication may be preserved during short OoC. Configured grants (grant-free) may be preserved and pursed in both the RRC type 1, which is only based on RRC-configured grants without any L1 signaling, and the type 2 configured grants which are based on the RRC configuration and an L1 signaling for the activation or deactivation, for example, while the connection of the UE to the base station shows a weak radio signal, for example a radio signal having a strength below a predetermined threshold, indicating that the UE is out-of-coverage. The resources are reserved for a time period not extending a predefined time interval, and the UE may by referred to as being out-of-coverage for a short time or for a medium time period. The time interval defining the short time or the medium time may be defined based on the network capabilities. Contrary to the short out-of-coverage, a complete out-of-coverage may be referred to in the following as a long out-of-coverage, i.e., in such a situation a time interval, which has been predefined, may have expired and after expiry, the UE is considered to be completely out-of-coverage. The UE being long out-of-coverage or completely out-of-coverage may be considered to mean that the UE is out-of-coverage and may not retain the RRC configuration that it used during in-coverage anymore. The UE being long out-of-coverage dumps the RRC configuration.

The configured grants may be configured using one or more of the following:
 configured grants for TX resource pools used for specific UEs,
 common configured grant resources used by a group UEs, configured with a group common signaling,
 common configured grant resources used by all UEs.

The configured grant resources may be configured via RRC and/or DCI signaling to be operating in or using one or more of:
 exceptional pools used during radio failure and other radio exceptional conditions,
 UL resources if the UE is allowed to perform SL communication over Uu configured resources,
 X/flexible/S resources or slots if the UE is allowed to perform SL communication over Uu configured resources,
 DL resources if the UE is allowed to perform SL communication over Uu configured resources,
 a SPS configuration configured to UE by an LTE device.

A timer may be provided either for the entire resource configuration or for every configured resource, like for every configured grant. The timer may be started responsive to the determination of a short OoC situation and may indicate a certain predefined time interval or length T that may be measured in milliseconds, a number of subframes or the like. The RRC configuration may be maintained or preserved during the predefined time interval T as defined by the timer. The timer may be referred to as a configured grant timer. For example, the configured grant timer may be included in the RRC configuration provided to the UE. In accordance with other examples, the timer may be pre-configured. The configured/pre-configured timer may start once:
 a UE determines a short out-of-coverage in the serving cell frequency list, and/or
 a UE determines a short out-of-coverage in neighboring cell frequency list, and/or
 a UE initiates a UE assisted Handover, and/or
 a UE started a gNB/eNB assisted Handover, and/or
 a UE determines that no sensing results are available in case Mode 2 is a gNB/eNB assisted mode, and/or
 the UE being in Mode 1 and changing to Mode 2.

If the UE is doing handover, the time may be longer than the HO timers, again provided the UE is configured to maintain RRC/configurations during the HO.

If the timer is for out-of-coverage, then the timer may be longer than a RLF, provided the UE is configured to maintain RRC/configurations during the this event. For example, during the period or phase between switching from Mode 1 to Mode 2 because of a radio link failure, RLF, the short OoC period may start prior to the RLF and continue beyond the RLF. For example, the short OoC may be based on a lower number of out-of-sync signaling received at the UE (prior to RLF/high RSRP/RSSI).

In accordance with examples, the timer may be provided for a specific UE, e.g., in case of a unicast or a broadcast, or for a group of UEs, e.g., in case of a groupcast or a broadcast.

The timer, like the configured grant timer avoids that a UE that went into the OoC status is considered to be in a long OoC status, i.e., the dumping of the RRC configuration is avoided. Further, by means of the timer the UE may obey requirements of a certain handover procedure, i.e., switching to a new cell and performing a new RRC configuration, and the timer may be provided either together with a handover command to the UE or following the handover command. The timer may allow the UE to stay connected while performing handover or when a HO stays for a time and is not successful. Further, the short OoC period as defined by the timer avoids that the current RRC configuration as used by the UE is wiped out by the new RC configuration, which may happen in case the UE, during the time defined by the timer, joins a new cell and receives a complete and successful handover with a new RRC configuration, or in case the cell joins back to the main or current cell and receives a new RRC reconfiguration.

The timer may be defined based on one or more of:
 a single fixed value configured via signaling or pre-configured in a UE or by a network
 more than one value configured via signaling or pre-configured in a UE or by a network
 one or more values configured via upper layer signaling, wherein the values convey one or more Quality of Services, QoS, indicator
 one or more values measured by the UE, wherein the UE may be requested to perform timing measurements, wherein the timing measurements may imply the different criteria, e.g., speed, route-direction, position, packet priority, QoS Embodiment 2

In accordance with the second embodiment, during a short OoC, a time-domain alignment to periodicities of configured grants may be performed. For example, for a transmission on one or more configured grant resources during the short OoC, as indicated by the configured/pre-configured timer, the periodicity P of the one or more configured grants, may be preserved by referring:
 only to the configured time-offset that may be synchronized to a last detected SFN (subframe number),
 to the configured time-offset+a correction from GNSS or other source UE(s) or another cell, etc.
 If indicated by RRC messages or upper layer, arbitrary selected time-offsets to arbitrary selected SFN, where the TX UE itself sends the appropriate PSSS (as configured or pre-configured) as a synchronization source for the serving UE,

Embodiment 3

In accordance with the third embodiment a time-domain allocation density may be performed during short OoC. For the transmission using configured grant resources during the short OoC period as defined by the configured/pre-configured timer, the time-domain resources periodicity P may as follows:

- an original periodicity P allocated by the base station via RRC and/or DCI before the OoC situation,
- a new periodicity P_new faster than an original periodicity P allocated by the base station via RRC and/or DCI before the OoC situation, for example such that P_new=P/2; or P_new=P/3, or P_new=P/4, . . . , or P_new=P/N, where N is an integer,
- a new periodicity P_new slower than an original periodicity P allocated by the base station via RRC and/or DCI before the OoC situation, for example such that P_new=2P; or P_new=3P, or P_new=4P, . . . , or P_new=N times P, where N is an integer.

The predefined time interval T, also referred to as the short or medium out-of-coverage duration, may be configured or pre-configured with one or more values, and the UE may select or expect to receive one of these values.

Embodiment 4

In accordance with the fourth embodiment, during the short OoC, a frequency domain allocation may be performed. For a transmission on configured grant resources during the short OoC, the frequency domain resources may as follows:

- the frequency domain allocation (configured or pre-configured) may be used, which has been specified in the original configured grant configurations, (either type 1 or type 2, resource allocation type 0/1 or dynamic), or
- a specific frequency domain allocation (configured/pre-configured) for OoC may be used. The specific frequency domain allocation may allocate 100% of the original resources in frequency allocated via RRC or DCI before the last out-of-coverage. In accordance with other examples, the specific frequency domain allocation may allocate X % of the original resources in frequency via RRC or DCI before the last out-of-coverage. X may be an arbitrary value between 0 and 100 and may be configured by upper or higher layer signaling or may be pre-configured in the UE or selected by the UE higher layers (UE behavior). The resources may be allocated from a lower PRB-VRB-sub-channel or from a higher PRB-VRB-sub-channel.

Embodiment 5

In accordance with the fifth embodiment, resources and/or reference signals may be randomized during the short OoC. For example, frequency and/or time-domain hopping for configured grants may be performed during short OoC. The UE may be configured or pre-configured to perform the hopping with a certain resource pattern.

For a transmission using the configured grant resources, which have been granted together with the timer, the operational frequency domain and time domain hopping during the short OoC may be configured. For example, the hopping may be configured using the RRC CG information element and may be activated via DCI.

Time Hopping

A time domain hopping may be applied by defining a time hopping sequence via a shift from a predefined transmission periodicity, for example, as follows:

- at a transmission instance T(n), a transmission is performed at T(n)=T_from_last_TX+P,
- at a transmission instance T(n+1), a transmission is performed at T(n+1)=T_from_last_TX+P+deltashift1,
- at a transmission instance T(n+2), a transmission is performed at T(n+2)=T_from_last_TX+P+deltashift2,
- . . . ,
- at a transmission instance T(n+M), a transmission is performed at T(n+M)=T_from_last_TX+P+deltashiftM,
- at T(mod(N,M+1)), with n=N transmission instance, M+1=end of shift counting, a transmission is performed at T(mod(N,M+1))=T_from_last_TX+P,
- wherein deltashiftX is the shift from P, either positive or negative, to generate a time hopping.

Frequency and Time Hopping

A frequency and time domain hopping may be applied by using one or more time/frequency resources patterns, TFRPs, for example defined or signaled, or pre-configured and indexed, or pre-configured and enabled. For example

- the UE may be requested, e.g., via RRC messages, to sense each TFRP, or
- the UE may be requested to change one or more TX parameters, e.g., reduce power and/or MCS, if one TFRP is used and sensing results is showing high chance of collision.

Frequency Hopping

Frequency domain hopping may be applied by defining a frequency hopping sequence, for example:

- by defining a hopping sequence within one configured grant resources within a time-slot and resource blocks, RB, and/or
- by defining a hopping sequence among frequencies configured to one or more other configured grants, and/or
- by defining a hopping sequence among frequencies granted to one or more other granted resources.

The UE may be requested, e.g., via RRC messages or inside the configured grants information elements, to perform the hopping with a certain pattern and/or sequence in time and/or frequency. The UE may also be requested, e.g., via RRC messages or inside the configured grants information elements or pre-configured in the UE or by upper-layers, to perform a random hopping in time and/or frequency.

In accordance with examples, it is assumed that the UEs, for example the UE being in the short OoC, and another terminal connected to this UE or being in a connection of the UE's broadcast, are synchronized, quasi-synchronized or operated in an asynchronous fashion.

Embodiment 6

In accordance with the sixth embodiment a DMRS sequence initialization may be performed during short OoC.

In accordance with examples a DMRS sequence may be defined to be initialized during the short OoC period as follows:

- the same DMRS sequence may be initialized by gNB via RRC/DCI configured grants,
- a pre-configured sequence may be used, wherein a DMRS sequence is enabled by RRC during the short OoC (e.g., DMRS_SeqInitialization_OoC or DMRS_SeqInitialization_OoC_index), a DMRS sequence is randomly selected by the UE or may be randomly identified by an upper layer to provide cover the DMRS sequence generation during the short OoC.

Further, a DMRS position hopping in time and frequency may be defined, for example by identifying hopping DRMS symbol positions and different OFDM resource element locations.

Further, DMRS sequence randomization may be defined to be selected by a UE to avoid DMRS collisions in case more than a pair of UEs are in the short OoC situation selecting from similar resources.

Embodiment 7

In accordance with embodiments predefined or specific resources are provided to be used by the UE during the short OoC moments or operation. The specific resources are also referred to as exceptional resources.

In accordance with the seventh embodiment the specific or exceptional resources may be defined to be exceptional pools, for example by respective RRC messages or by using a pre-configuration. The exceptional pools may be, for example, one or more of the following:
- an exceptional pool with respective time frequency resources, for example a pool similar to pool as defined by SL-CommResourcePoolV2X-rXX. The exceptional pool may be split into:
  - time frequency patterns, wherein a UE is requested to perform sensing on all the different time frequency patterns, after which the UE may select one or more patterns for a transmission, or
  - time frequency patterns, wherein a UE is requested to perform sensing on some or dedicated ones of the time frequency patterns, after which the UE may select one or more patterns for a transmission, or
  - time frequency patterns, wherein a UE is requested to use a dedicated time frequency pattern for a transmission. The dedicated time frequency pattern may be identified by a specific RRC signaling, or by a specific DCI signaling (either to select one or more exceptional resources among multiple configured/preconfigured exceptional resources), or by a group common RRC signaling (for a group of UEs), or by a group common PDCCH/DCI signaling (for a group of UEs).
- an exceptional pool with respective time frequency resources, defined by, for example, SL-CommResourcePoolV2X-rXX. Within the pool there may be one or multiple configured grants, for examples, in case the channel shows high congestion values (such as high Channel Busy Ratios (CBR)) or high data traffic loads (like high number of scheduling request (SR) or buffer status report (BSR)). The UE may be requested to:
  - select among all configured grants, or
  - to select among configured grants, e.g., up to 8 or more configurations, in time with a time offset and a periodicity P, but with same frequency, or
  - select among configured grants, e.g., up to 8 or more configurations, in frequency with different subchannels/subbands/RB-frequency offset, but with same time offsets and periodicity P, or
  - select among configured grants, e.g., up to 8 or more configurations, in both frequency with different subchannels/subbands/RB-frequency offset and time with time offset and periodicity, or
  - select only one configuration which may be indicated by a specific RRC signaling, by a specific DCI signaling, by a group common RRC signaling (for a group of UEs), or by a group common PDCCH/DCI signaling (for a group of UEs).

A switching to the exceptional resources may be performed once a UE identifies or determines a short OoC situation. In accordance with other examples, the switching to the exceptional resources may be done once a gNB identifies a possible out-of-coverage situation. The gNB may also provide the timer. In case a timer is defined, the exceptional resources may be used until the timer expires.

In accordance with the examples, the exceptional resources may be within an exceptional pool, and respective time and frequency resources may be configured as configured grants, for example using RRC messages or a pre-configuration. The configured grants may be configured, for example, for:
- a UE with a need for either an exceptional pool or a CG within an exceptional pool, or
- UEs in different mode (either Mode 1 or Mode 2 (gNB/eNB assisted) or both), i.e., exceptional resources are provided for of each of the different modes, or
- a group of UEs, for example, in case the UEs initiate a group communication and are in need of tight radio exceptional conditions. The group of UEs may have a group common PDCCH or a group common RRC messages, or
- a group of UEs tied by the network based on the network load or a positioning specification of the UEs (geo-spatial locations), or
- a cell wide or a zone wide exceptional pool, e.g., an exceptional pool per cell or per-zone or validity area. The pools in each case may be configured by RRC or pre-configuration. An activation and deactivation of the pools may be via RRC signaling Embodiment 8

In accordance with the eighth embodiment, exceptional resources may be defined by network configured resources within a normal TX resource pool, i.e., not using an exceptional resource pool.

The exceptional resources in accordance with the eighth embodiment may be defined as a set of fixed configured grant resources or as configured grant resources with multiple active or inactive configured grant configurations (the grant resources may be configured by a ConfiguredGrantConfig message, or only by an rrc-ConfiguredUplinkGrant message, or by an rrc-ConfiguredSidelinkGrant message, wherein the configured grants information may carry exceptional timers that allow operation outside coverage).

The switching to the exceptional resources may be done once a UE identifies or determines a short OoC situation. In accordance with other examples, the switching to the exceptional resources may be done once a gNB identifies a possible out-of-coverage situation. The gNB may also provide the timer. In case a timer is defined, the exceptional resources may be used until the timer expires.

Embodiment 9

In accordance with the ninth embodiment the exceptional resource definition may be configured as exceptional configured grants within exceptional pools or within normal TX pools.

The exceptional configured grants may be defined using RRC messages only, or using UE-specific/group-specific RRC and/or DCI messages, or, in case the exceptional configured grants are configured in time and frequency, they may be defined using an (exceptional)-ConfiguredGrant-Config message, or only an (exceptional)-rrc-ConfiguredUplinkGrant message, or an rrc-ConfiguredSidelinkGrant message, wherein the configured grants information may carry exceptional timers that allow operation outside coverage.

The exceptional configurations may be selected by the UE and may be used during in coverage and during out-of-coverage until the timer expired once or multiple times.

The timers of the exceptional pool may define how long the exceptional resource pool is used during out-of-coverage, when out-of-coverage is triggered. The timers of the configured grants defined within an exceptional pool, if timers are defined, may be overwritten by exceptional resource pool timers if they exist.

Once any of the previously configured/preconfigured timers expires, the UE may select to switch to pre-configured resources. The time may be defined for: short out-of-coverage, medium out-of-coverage, and any non-persistence out-of-coverage or non-deep out-of-coverage.

Embodiment 10

In accordance with the tenth embodiment configured grants within an exceptional pool may be employed for a handover.

In case of a handover as well as in case of other exceptional situations, such as RLF or the absence of sensing results, conventional LTE V2X communication uses an exceptional pool providing a random selection of resources on the target cell exceptional pool provided the exceptional pool is included in the handover command. This, however, implies a high risk of collisions, congestion and impacts the reliability and the latency of the communication. Therefore, in accordance with the tenth embodiment, during handover, configured grants may be used as follows:

defined configured grants for the exceptional pool—for the handover case (similar to embodiment 9):
The signaling exchange during the handover procedure may include configured grants on exceptional pools of the target cell if the exceptional transmission resource pool is included in the handover command.
The IE for the NR sidelink exceptional pool V2X from Release-16 onwards may be enhanced to add an IE with the configured grants.
defined configured grants for the exceptional pool—for the handover case (similar to embodiment 9):
The signaling exchange during the handover procedure may include configured grants on exceptional pools of the serving cell.
The IE for NR sidelink exceptional pool V2X from Release-16 onwards may be enhanced to add an IE with the configured grants.
define configured grants in a common TX pool to be used as exceptional recourses (similar to embodiment 8).
Similar to embodiments 1 to 6 and embodiment 8, a field may be added to the IE ConfiguredGrantConfig to include timers and facilities as described in embodiment.
Similar to embodiments 1 to 6, during handover, the configured grants of the CommTxPool may be re-used if timers and facilities are defined as in embodiments 1 to 6.

In accordance with embodiments, exceptional configured grants provided in exceptional pools or common TX pools may be employed for a handover between different RATs.

The UE may be configured by a NR serving cell and move to an LTE target cell or vice versa, and a CG may be defined to be used in the target cell (e.g., including NR Type 1 like CG, NR Type 2 like CG with some limitation for LTE operation, or LTE like SPS) and may be used during handover, inside:
an exceptional pool of the T-Cell or target cell (and T-Cell frequencies) or the S-Cell or serving cell (and S-Cell frequencies), or
a TX pool of the T-Cell (and T-Cell frequencies) or the S-Cell (and S-Cell frequencies).

The UE may be configured by a LTE serving cell and move to a NR LTE target cell, and a resource configuration may be defined to be used in the target cell, e.g., as an SPS configuration, and may be used during handover, inside:
an exceptional pool of the T-Cell or target cell (and T-Cell frequencies) or the S-Cell or serving cell (and S-Cell frequencies), or
a TX pool of the T-Cell (and T-Cell frequencies) or the S-Cell (and S-Cell frequencies).

CG (SPS) may be configured previously for normal communications with timers for exceptional communication, similar to embodiment 1, or CG (SPS) may be configured for exceptional communications, similar to embodiment 9.

Embodiment 11

In accordance with the eleventh embodiment the exceptional resources may be used for a deep or long out-of-coverage. In accordance with the eleventh embodiment, a UE may be configured by a serving cell to use exceptional pools as in embodiment 7, or configured grants in exceptional pools as described in embodiment 8, or TFRPs as described in embodiment 5, or configured grants exceptionally configured for exceptional cases to be used during actual out-of-coverage. In this case, the configurations may be selected in or on pools, including the exceptional pools, that allow out-of-coverage pools, for example:
depending on the positioning information some frequencies may be identified,
depending on the operator licensed and unlicensed access,
depending on dedicated frequencies for V2X/SUD2D unlicensed access.

Further Embodiments

In the following examples employing the embodiments described above will be described. For example, when considering a situation as explained above with reference to FIG. 4, the RRC/DCI configuration for a legacy V2X communication is removed or deleted and overwritten by a pre-configuration in case it is determined that the UE, like UE3, is out-of-coverage on the supported frequency list. This may not be sufficient for advanced V2X use cases, especially when the out-of-coverage happens frequently and only for short times as described above. In such a case, in accordance with the present invention, RRC enhancements are introduced to allow, for example, for the provision of a timer that is configured to identify the UE as being in a short time out-of-coverage, short OoC, and that may be measured in milliseconds, slots, symbols, subframes and the like. During this time, the UE keeps the RRC/DCI configurations for the time of the identified timer. More details about the short OoC timers, the RRC configurations, the time and frequency allocation and the different time offsets and time periodicities are now described with reference to the above-described embodiments.

Short OoC Handling

For RRC-connected/active/inactive or for RRC-idle/inactive, the RRC configurations for configured grants configuration may include a field that specifies and/or configures one or more timers operating during the short OoC scenarios, as described above with reference to embodiment 1. For example, the timer may be defined as follows:

| | |
|---|---|
| configuredGrantShortOoCTimer | INTEGER (1..64/ or 128/ or 256/etc.), |
| or | |
| configuredGrantTimer | INTEGER (1..64/ or 128/ or 256/etc.) |

This definition may be included into the respective configuration, for example into the following configurations:

| | |
|---|---|
| ConfiguredGrantConfig ::= | SEQUENCE { |
| Or | |
| rrc-ConfiguredUplinkGrant | SEQUENCE { |

In accordance with other embodiments, the timer may be identified in a SIB broadcasted RRC configuration that may include one or more of the timers so as to indicate how a short OoC, measured in milliseconds, slots, subframes or symbols, may be handled.

A short OoC situation may be identified by a UE, which may be RRC_IDLE or RRC_CONNECTED/active or RRC_CONNECTED inactive, using one or more of:
  a coverage status and measurements, or
  a network structure and architecture, or
  road-side units information, or
  the network, gNB and/or eNB configuration (via specific RRC messages or broadcast RRC messages or early-handover commands (may be without measurements or handover timers triggering), or
  the preconfigured short out-of-coverage values, if identified by a permanent pre-configurations or updated by the network.

In accordance with other embodiments, the short OoC may be identified by a base station, like gNB or an eNB based on
  an RRC reconfiguration due to network load or other provisioning of the gNB, or
  a DCI specific control information, or
  an RRC broadcast information via, e.g., SIB messages.

Once a short OoC is identified the UE may continue using the last or latest configuration until a timer, like the configured grant timer expires. The UE may perform a cell search during short OoC as follows:
  combine all occurrences of "out-of-coverage on the frequency used for V2X sidelink" with the timer, or
  combine all occurrences of "the UE cannot detect any cell on that frequency meeting the S/SL/sidelink criterion" with the timer.

During short OoC a UE, which is connected to a primary cell and/or to a secondary cell, may evacuate the resource configuration only when the measurements indicate an out-of-coverage situation and when the timer expired.

Information about a time domain alignment may be obtained as described above with reference to embodiment 2, while information about time domain periodicity and time domain density during the short OoC, while pursing the CG, may be done as described above with reference to embodiment 3. Information about frequency location and frequency resource selection during the short OoC with configured grants may be done as described above with reference to embodiment 4.

Figure 6:
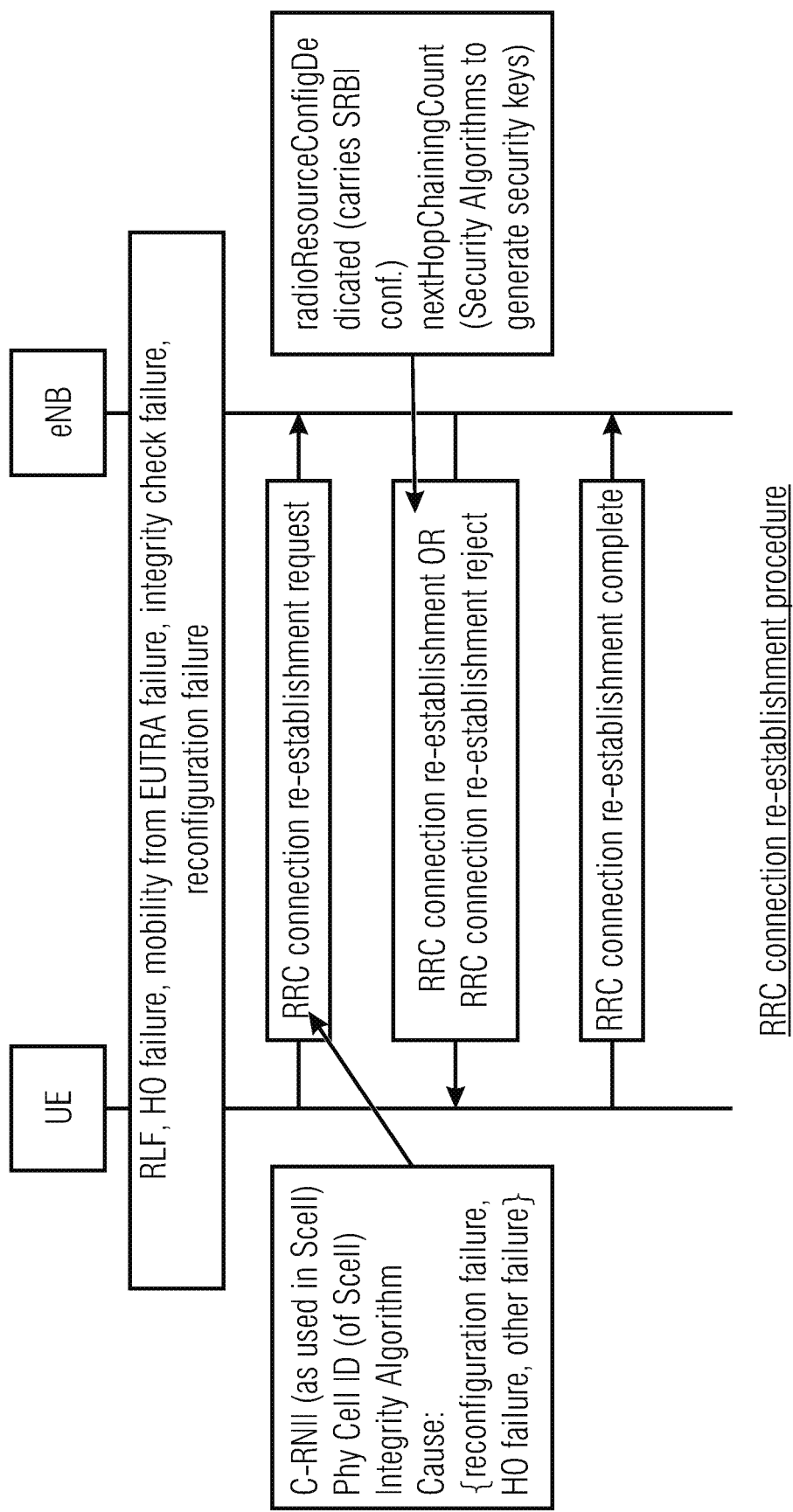
FIG. 6 illustrates schematically a known RRS Connection Re-Establishment Procedure.

FIG. 6 illustrates schematically a known RRS Connection Re-Establishment Procedure and in accordance with embodiments the short OoC coverage may start before the radio link failure and once the radio link failure happens until the defined short OoC timer expires or until the UE radio quality is back in good shape and receives a new RRC configuration. In accordance with other embodiments, the short OoC coverage may start once a handover command is triggered and until the handover command is successful and the UE receives the new cell RRC configuration.

Randomization among UEs during short OoC

In accordance with embodiments, during the short OoC the UE may perform a randomized resource selection. Resources may be selected from a plurality of time/frequency resource patterns, TFRPs. The patterns may be configured or pre-configured for the UE during RRC Connected/Idle or during RRC Disconnected. The UE may be configured to one TFRP or to multiple TFRPs identified for the UE. In case multiple TFRPs are configured, during the short OoC, if identified, the UE performs sensing on the configured TFRPs.

The time and frequency resources may also be configured as multiple configured grants. The UE selects among the active configured grants the active configured grants to be used for the transmission. The configuration may include type 1 configured grants, wherein the RRC configuration includes one or more configured grants and runs until a next RRC reconfiguration. In case the RRC configuration is kept during the short OoC, the UE may be configured to select randomly among the configured grants from the existing RRC configuration.

For type 2 configurations, the gNB may specify a hopping sequence among the configured grants using DCI signaling. Also activating one or more configured grants or deactivating one or more configured grants may be done using DCI signaling. The DCI signaling may be a user specific DCI signaling or a group common, GC, PDCCH/DCI signaling. The time/frequency hopping may be performed in a way as described above with reference to embodiment 5.

The randomization may also be performed on selected DMRS sequences that are generated by the UE for a sidelink transmission. The UE may select randomly one or more DMRS sequences during its SL transmission to minimize collision on reference signals. The sequence may be configured or may be pre-configured, for example based on a mode of operation and/or based on the UE capabilities. Further, the UE may have different starting positions among the symbols or different frequency or resource elements or a combinations of DMRS types/options based on signaling configurations or based on pre-configuration again selected dependent on a mode of operation or the UE capabilities. The DMRS hopping and pattern selection may be performed in a way as described above with reference to embodiment 6.

Enhancements for Exceptional Resources

In accordance with yet further embodiments, specific resources may be provided that are to be used by the UE during the OoC situation for a time as specified, for example, by the timer. According to embodiments, exceptional pools as they are basically known in the art, may be employed for this purpose. More specifically, embodiments provide enhancements for exceptional pools or exceptional resources to be used during the short OoC situation. In accordance with embodiments, the exceptional pools may also be employed for the long OoC situations so as to define a specific resource set to be used by all UEs dropping into out-of-coverage. In accordance with examples, the network or base station, like the gNB, may define respective exceptional resources to be used by a UE once a short OoC situation is identified.

In accordance with embodiments, the exceptional resources may be configured as an Release-15 exceptional pool using normal SL-CommResourcePoolV2X-rXX, which in turn may be split into multiple exceptional pools, each of which targets one or more UEs. Different exceptional pools may be configured or different time/frequency regulations may be configured. During the short OoC, the resources of the exceptional pools may be selected randomly from multiple TFRPs using either random selection or sensing. If the UE is configured with an exceptional pool, the UE may monitor the RRC specifics/group common signaling or the DCI/PDCCH specific/group common signaling for selecting one or more TFRPs once the UE goes to OoC and may use it during the short OoC time, for example until the timer described above expires.

Moreover, resources in the exceptional pool may be configured as configured grants. The configured grants may be split to one each per UE or to one per group of UEs. Splitting the configured grants to one per group of UEs may be used for group tied communication or to any other geo-spatial need seen by a base station or the network.

Multiple exceptional pools or an exceptional pool with multiple configured grants may be used in one or more of the following situations entailing a special exceptional resource set:
- a UE with a need for either exceptional pool or a CG within an exceptional pool, or
- UEs in different mode (either 1 or 2 (assisted by gNB/eNB) or both), i.e., exceptional resources of each or different modes, or
- a group of UEs (where they initiate a group communication) and they need tight radio exceptional conditions. This group of UEs may have a group common PDCCH or a group common RRC messages, or
- a group of UEs tied by the network based on the network load or their positioning specification (geo-spatial locations), or
- a cell wide or a zone wide exceptional pool, for example, an exceptional pool per cell or per-zone or validity area. The pools in each case may be configured by RRC or pre-configuration. The activation and deactivation of the pools may be via RRC signaling.

The provision of the additional specific resources may be handled in accordance with embodiment 7 as described above in detail.

In case an exceptional pool is not defined or not signaled via a SIB broadcast, the exceptional or specific resources may be configured as configured grants or as a set of configured grants which are configured within one or more normal TX resource pools. However, these resources may only be used in the situations described above in which the above described exceptional pool may be used. This means that in accordance with this embodiment, no extra pools are defined or configured on top of the TX pool, rather one or more of the resources, like configured grants, are determined which may be used only in case an exceptional situation is determined, like a RLF, a handover or a sensing is not available for UE-selected resources, for example when the UEs in Mode 2 or Mode 4. The configured grants may be configured using a specific RRC/TCI signaling for each UE or for all UEs in a groups, as is described above in detail with referenced to embodiment 9.

In accordance with yet another embodiment configured grants may be configured specifically to be used also for normal and exceptional situations. The UE may be configured to one of these CGs which may be used in case other regular or normal configured grants cannot be resumed during the short OoC, even with a short OoC timer defined. This may be useful for type 2 configured grants as normal CG resources within the normal in-coverage operation need to be constantly connected so as to receive DCI messages and to provide UE feedback. Hence, in such a situation, the UE may be allowed to switch temporarily, for example in case of a short OoC, to one of the exceptionally configured CGs within the UE lists of multiple active configured grants, if defined. A fallback to the exceptional pool is described in embodiments 7 and 9 above and maybe applied if the UE is not configured by one of the long-lasting CGs. The UE may identify the CG by having a configured grant timer configured in its configuration body, as described above. In accordance with other examples the configuration header, for example the ConfiguredGrantConfig, may include another identification like (SL_commV2X)_configured_GrantExceptional. In other words, the network or the gNB may configure the UE with one or more exceptional configured grants, and the exceptional configured grants may be used during the in-coverage or during the short OoC as defined by the timer. The ending of the exceptional configured grants may be performed in a way as described above with reference to embodiment 8.

Exceptional Configured Grants

Further embodiments concerning the use of exceptional configured grants in the exceptional pool and a TX pool are now described. The following embodiments provide improvements to the use of the exceptional pool which is often to be used during a delay critical scenario as well as two fulfill strict requirements as defined, e.g., by Release-16 and other use cases. Improvements may also be entailed due to the typical aperiodic traffic to be expected on the exceptional pool.

In accordance with embodiments, improvements with regard to the use of exceptional pools may include introducing configured grants in a way it is explained above with reference to embodiment 9. Thus, in accordance with embodiment 9, specific configured grants for the exceptional pool, for example the UEs specific or groups specific configured grants of type 1 or type 2, may be provided. The specific CG configured in the exceptional pool may be used temporarily during handover until the handover is successful so as to also handle handover failures. For the handover, in accordance with embodiments, configured grants may be defined in the exceptional pool in a way it is described with reference to embodiment 9 which may also include mechanisms as described above with reference to embodiments 1 to 6.

In accordance with other embodiments, configured grants may be defined in a normal TX pool to be used exceptionally during the handover, for example by applying the approach described above with reference to embodiment 8, which may also include further mechanisms from embodiments 1 to 6.

In accordance with the yet other embodiments, the configured or previously configured grants, that are still active or available for the UE, i.e., one or more of the configured grants dedicated for the UE, may be reused during the handover, similar to the approach described in embodiment 1, which may include mechanisms from embodiments 2 to 6.

Thus, in accordance with the above embodiments, resources may be defined/configured in the serving cell pools, including the serving cell exceptional pools, or there may be defined/configured in the target cell pools. The resources may be used temporarily until either a successful handover ending with a new RRC configuration, including a new CG from the target cell, or once a complete out-of-failure occurred that is not revertible. If the resources are configured in the target cell a normal TX pool as normal configured grants, they may be used for a longer timer or until the new RRC configuration is available, as is now described.

During handover, in accordance with an embodiment, the UE may use the target cell exceptional pool or normal TX pool resources, or, in accordance with another embodiment, may use the serving cell exceptional pool or normal TX pool resources.

When using the T-Cell pool resources, the handover signaling, like the handover command sent by the target cell, for example a RRC Connection Reconfiguration Request, may include one or more of the following RRC configurations:
  an RRC_ConfigGrantXXX in the exceptional Pool during handover: (as in Embodiment 9), i.e., configured within the T-Cell exceptional pool.
  The mechanisms from embodiments 1 to 7 and 9 may be applied.
  Instead of a configuration, also one or more TFRPs may be configured similar to embodiment 5.
  An RRC_ConfigGrant_Exeptionally during handover: (as in embodiment 8), i.e., configured within the T-Cell normal pool(s)
  The mechanisms from embodiment 1 to 6 may be applied.
  Instead of a configuration, one or more TFRPs may be configured similar to embodiment 5.
  The UE may temporary use those CG until it receives a new configuration.
  An RRC_ConfigGrant extended the use to/during the Handover; i.e., in this case, the target cell provides (e.g. included in the Handover Command) resources to be used for CG during the handover and/or after the handover is successful. The CG may be part of the target cell exceptional pool configuration IE included in the Handover Command or transmitted in a separate or different message or IE.
  By allowing CG in the exceptional or common TX pool during the handover phase, the latency and reliability will enhance as well as continuous connectivity without service interruption may be provided, which improve the handover process when compared to Release-15 LTE V2X, where the resources are randomly selected on the exceptional pool.

In case the UE uses the S-Cell pool resources the handover signaling, for example the handover command sent by the serving cell, for example a RRC Connection Reconfiguration Request which is the message sent from the target cell to the serving cell, may not include the target cell exceptional RRC Configurations, i.e., does not include the exceptional pools or CGs to be used exceptionally or normally during handover. In such a scenario, the UE may use the serving cell exceptional resources as follows:
  an RRC_ConfigGrantXXX in an exceptional Pool (as in Embodiment 9), i.e., configured within the S-Cell exceptional pool.
  The mechanisms from embodiments 1 to 8 may be applied.
  Instead a of configuration, one or more TFRPs may be configured similar to embodiment 5.
  an RRC_ConfigGrant_Exeptionally (as in Embodiment 8), i.e., configured within the S-Cell Normal pool(s).
  The mechanisms from embodiments 1 to 6 may be applied to embodiment 8.
  Instead of a configuration, one or more TFRPs may be configured similar to embodiment 5.
  The UE may temporary use those CGs until it receives a new configuration from the new cell or declare a deep Out of Coverage
  a Normal RRC_ConfiGrant extended the use (as in embodiment 1 and applying mechanisms from embodiments 2 to 6) during the Handover; i.e., in this case, the serving cell provides the timers and the exceptional usage of the configured grants during the handover.

In accordance with embodiments, for a handover between different RATs, i.e., a UE moves from NR to LTE or vice versa, the UE may be configured by an NR Uu including:
  Sidelink dynamic grants
  Sidelink configured grants of Type 1 (RRC bases)
  Sidelink configured grants of Type 2 (RRC+L1 (DCI) activation/deactivation), and the UE may be configured by an LTE Uu including:
  Sidelink dynamic grants
  Sidelink configured grants of Type 1 (RRC bases) (adopted from SPS for sidelinks)

In case a UE moves from a NR S-Cell to a LTE T-Cell, i.e., if a UE moves from the NR serving cell to an LTE target cell, during handover or when the short out of coverage timers are running, the UE may keep the configured grant type 1, i.e., is configured by the serving NR cell. Once the timer expires, the UE may start to use the SPS configuration provided by the target cell, the LTE cell, similar to embodiment 1, embodiment 9, and/or embodiment 10. In this embodiment, the SPS to be used during handover may be included in the handover command from the NR serving cell to the LTE target cell. This SPS may be using a period and resources of a Target cell LTE frequencies or NR frequencies, e.g., including exceptional pools in any of the cells.

In case the UE moves from a LTE S-Cell to a NR T-Cell, i.e., when the UE moves from an LTE serving Cell to an NR target cell, the handover command may indicate a configured granted, e.g., in form of SPS configured by LTE, assigned to the UE for exceptional uses (e.g., according to embodiments 1 or 9) or in exceptional pools (see embodiment 8). The target gNB, if needed, may overwrite the last serving LTE configuration, e.g., the SPS configurations. Additionally, the target cell may continue to use the same time and periodicity either on the same frequency or on NR assigned frequencies, including, e.g., new PRBs allocation. If needed, the target cell may include exceptional configured grants, e.g., in the in handover commands, to be used during handover from LTE S-Cell to NR T-Cell.

Long- or Deep Out-Of-Coverage

In accordance with further embodiments procedures for a deep out-of-coverage may be implemented, also referred to as long out-of-coverage, e.g., an out-of-coverage longer than the short-term out-of-coverage, for example after the timer expired. In such embodiments the UE may be configured by a serving cell to use exceptional pools as described in embodiment 7 or configured grants in the exceptional pool, as described in embodiment 8, or TFRPs as described in embodiment 5, or exceptionally configured grants configured for exceptional cases during the actual out-of-coverage.

In such cases the configurations may be selected on pools, including the exceptional pools, that allow out-of-coverage pools. For example, some frequencies may be defined dependent on positioning information, or dependent on an operator license and unlicensed access. Also, dedicated frequencies for V2X/SL/D2D unlicensed access may be used.

Modified Information Elements, IEs

All the indicated (highlighted) in the table and in the information elements below may be changed according to the inventive approach.

For the V2X sidelink in LTE (R14/A1) the sidelink (SL) resource pool configuration is transmitted in the System Information Block 21. The tables below show relevant extracts of the System Information Block 21 for reference to the Information elements (IE) and indicate where the enhancements according to the present invention may be reflected. More specifically, the information elements (IE) being underlined and printed in bold may be modified or changed according to the inventive approach described herein (see TS 36.331 concerning for V2X, referring to exceptional pool):

SystemInformationBlockType21 information element

```
SystemInformationBlockType21-r14 ::= SEQUENCE {
    sl-V2X-ConfigCommon-r14              SL-V2X-ConfigCommon-r14              OPTIONAL,   -- Need OR
    lateNonCriticalExtension             OCTET STRING                         OPTIONAL,
    ...
}
SL-V2X-ConfigCommon-r14 ::=              SEQUENCE {
    v2x-CommRxPool-r14                   SL-CommRxPoolListV2X-r14             OPTIONAL,   -- Need OR
    v2x-CommTxPoolNormalCommon-r14       SL-CommTxPoolListV2X-r14             OPTIONAL,   -- Need OR
    p2x-CommTxPoolNormalCommon-r14       SL-CommTxPoolListV2X-r14             OPTIONAL,   -- Need OR
    v2x-CommTxPoolExceptional-r14        SL-CommResourcePoolV2X-r14           OPTIONAL,   -- Need OR
    v2x-SyncConfig-r14                   SL-SyncConfigListV2X-r14             OPTIONAL,   -- Need OR
    v2x-InterFreqInfoList-r14            SL-InterFreqInfoListV2X-r14          OPTIONAL,   -- Need OR
    v2x-ResourceSelectionConfig-r14      SL-CommTxPoolSensingConfig-r14       OPTIONAL,   -- Need OR
    zoneConfig-r14                       SL-ZoneConfig-r14                    OPTIONAL,   -- Need OR
    typeTxSync-r14                       SL-TypeTxSync-r14                    OPTIONAL,   -- Need OR
    thresSL-TxPrioritization-r14         SL-Priority-r13                      OPTIONAL,   -- Need OR
    anchorCarrierFreqList-r14            SL-AnchorCarrierFreqList-V2X-r14     OPTIONAL,   -- Need OR
    offsetDFN-r14                        INTEGER (0..1000)                    OPTIONAL,   -- Need OR
    cbr-CommonTxConfigList-r14           SL-CBR-CommonTxConfigList-r14        OPTIONAL    -- Need OR
}
```

SL-CommResourcePoolV2X-r14 information element

```
SL-CommResourcePoolV2X-r14 ::=           SEQUENCE {
    sl-OffsetIndicator-r14               SL-OffsetIndicator-r12               OPTIONAL,   -- Need OR
    sl-Subframe-r14                      SubframeBitmapSL-r14,
    adjacencyPSCCH-PSSCH-r14             BOOLEAN,
    sizeSubchannel-r14                   ENUMERATED {
                                             n4, n5, n6, n8, n9, n10, n12, n15, n16, n18, n20, n25, n30,
                                             n48, n50, n72, n75, n96, n100, spare13, spare12, spare11,
                                             spare10, spare9, spare8, spare7, spare6, spare5, spare4,
                                             spare3, spare2, spare1},
    numSubchannel-r14                    ENUMERATED {n1, n3, n5, n8, n10, n15, n20, spare1},
    startRB-Subchannel-r14               INTEGER (0..99),
    startRB-PSCCH-Pool-r14               INTEGER (0..99)                      OPTIONAL,   -- Need OR
    rxParametersNCell-r14                SEQUENCE {
        tdd-Config-r14                   TDD-Confiq                           OPTIONAL,   -- Need OP
        syncConfigIndex-r14              INTEGER (0..15)
    }                                                                         OPTIONAL,   -- Need OR
    dataTxParameters-r14                 SL-TxParameters-r12                  OPTIONAL,   -- Cond Tx
    zoneID-r14                           INTEGER (0..7)                       OPTIONAL,   -- Need OR
    threshS-RSSI-CBR-r14                 INTEGER (0..45)                      OPTIONAL,   -- Need OR
    poolReportId-r14                     SL-V2X-TxPoolReportIdentity-r14      OPTIONAL,   -- Need OR
    cbr-pssch-TxConfigList-r14           SL-CBR-PPPP-TxConfigList-r14         OPTIONAL,   -- Need OR
    resourceSelectionConfigP2X-r14       SL-P2X-ResourceSelectionConfig-r14   OPTIONAL,   -- Cond P2X
    syncAllowed-r14                      SL-SyncAllowed-r14                   OPTIONAL,   -- Need OR
    restrictResourceReservationPeriod-r14 SL-RestrictResourceReservationPeriodList-r14 OPTIONAL,-- Need OR
}
```

Upon receiving SystemInformationBlockType21, the UE shall:
1> if SystemInformationBlockType21 message includes sl-V2X-ConfigCommon:
   2> if configured to receive V2X sidelink communication:
      3> use the resource pool indicated by v2x-CommRxPool in sl-V2X-ConfigCommon for V2X sidelink communication monitoring, as specified in 5.10.12;
   2> if configured to transmit V2X sidelink communication:
      3> use the resource pool indicated by v2x-CommTxPoolNormalCommon, p2x-CommTxPoolNormalCommon, v2x-CommTxPoolNormal, p2x-CommTxPoolNormal or by v2x-CommTxPoolExceptional for V2X sidelink communication transmission, as specified in 5.10.13;
      3> perform CBR measurement on the transmission resource pool(s) indicated by v2x-CommTxPoolNormalCommon, v2x-CommTxPoolNormal and v2x-CommTxPoolExceptional for V2X sidelink communication transmission, as specified in 5.5.3;

In the new radio (NR) standard, the following is specified for configured grants:

The RRC protocol includes the following main functions:
...
- RRC connection control:
...
  - QoS control including assignment/ modification of semi-persistent scheduling (SPS) configuration and configured grant configuration for DL and UL respectively, assignment/ modification of parameters for UL rate control in the UE, i.e. allocation of a priority and a prioritised bit rate (PBR) for each RB.

ConfiguredGrantConfig

The IE ConfiguredGrantConfig is used to configure uplink transmission without dynamic grant according to two possible schemes. The actual uplink grant may either be configured via RRC (type1) or provided via the PDCCH (addressed to CS-RNTI) (type2).

ConfiguredGrantConfig information element

```
-- ASN1START
-- TAG-CONFIGUREDGRANTCONFIG-START
ConfiguredGrantConfig ::=          SEQUENCE {
    frequencyHopping               ENUMERATED {intraSlot, interSlot}         OPTIONAL,   -- Need S,
    cg-DMRS-Configuration          DMRS-UplinkConfig,
    mcs-Table                      ENUMERATED {qam256, qam64LowSE}           OPTIONAL,   -- Need S
    mcs-TableTransformPrecoder     ENUMERATED {qam256, qam64LowSE}           OPTIONAL,   -- Need S
    uci-OnPUSCH                    SetupRelease {CG-UCI-OnPUSCH}             OPTIONAL,   -- Need M
    resourceAllocation             ENUMERATED {resourceAllocationType0, resourceAllocationType1, dynamicSwitch},
    rbg-Size                       ENUMERATED {config2}                      OPTIONAL,   -- Need S
    powerControlLoopToUse          ENUMERATED {n0, n1},
    p0-PUSCH-Alpha                 P0-PUSCH-AlphaSetId,
    transformPrecoder              ENUMERATED {enabled, disabled}            OPTIONAL,   -- Need S
    nrofHARQ-Processes             INTEGER(1..16),
    repK                           ENUMERATED {n1, n2, n4, n8},
    repK-RV                        ENUMERATED {s1-0231, s2-0303, s3-0000}    OPTIONAL,   -- Need R
    periodicity                    ENUMERATED {
                                       sym2, sym7, sym1x14, sym2x14, sym4x14, sym5x14, sym8x14, ...,
    },
    configuredGrantTimer           INTEGER (1..64)                           OPTIONAL,   -- Need R
    rrc-ConfiguredUplinkGrant      SEQUENCE {
        timeDomainOffset           INTEGER (0..5119),
        timeDomainAllocation       INTEGER (0..15),
        frequencyDomainAllocation  BIT STRING(SIZE(18)),
        antennaPort                INTEGER (0..31),
        dmrs-SeqInitialization     INTEGER (0..1)                            OPTIONAL,   -- Need R
        precodingAndNumberOfLayers INTEGER (0..63),
        srs-ResourceIndicator      INTEGER (0..15)                           OPTIONAL,   -- Need R
        mcsAndTBS                  INTEGER (0..31),
        frequencyHoppingOffset     INTEGER (1.. maxNrofPhysicalResourceBlocks-1)
                                                                             OPTIONAL,   -- Need R
        pathlossReferenceIndex     INTEGER (0..maxNrofPUSCH-PathlossReferenceRSs-1),
        ...
    }                                                                        OPTIONAL,   -- Need R
    ...
}
CG-UCI-OnPUSCH ::= CHOICE {
    dynamic                        SEQUENCE (SIZE (1..4)) OF BetaOffsets,
    semiStatic                     BetaOffsets
}
-- TAG-CONFIGUREDGRANTCONFIG-STOP
-- ASN1STOP
```

| ConfiguredGrantConfig field descriptions |
| --- |
| configuredGrantTimer<br>Indicates the initial value of the configured grant timer (see TS 38.321 [3]) in multiples of periodicity.<br>frequencyDomainAllocation<br>Indicates the frequency domain resource allocation, see TS 38.214 [19], clause 6.1.2, and TS 38.212 [17], clause 7.3.1).<br>frequencyHopping<br>The value intraSlot enables 'Intra-slot frequency hopping' and the value interSlot enables 'Inter-slot frequency hopping'. If the field is absent, frequency hopping is not configured.<br>frequencyHoppingOffset<br>Enables intra-slot frequency hopping with the given frequency hopping offset. Frequency hopping offset used when frequency hopping is enabled (see TS 38.214 [19], clause 6.1.2).<br>powerControlLoopToUse<br>Closed control loop to apply (see TS 38.213 [13], clause 7.1.1).<br>rbg-Size<br>Selection between configuration 1 and configuration 2 for RBG size for PUSCH. The UE does not apply this field if resourceAllocation is set to resourceAllocationType1. Otherwise, the UE applies the value config1 when the field is absent. Note: rbg-Size is used when the transformPrecoder parameter is disabled.<br>repK-RV<br>The redundancy version (RV) sequence to use. See TS 38.214 [19], clause 6.1.2. The network configures this field if repetitions are used, i.e., if repK is set to n2, n4 or n8. Otherwise, the field is absent.<br>repK<br>The number of repetitions of K.<br>rrc-ConfiguredUplinkGrant<br>Configuration for "configured grant" transmission with fully RRC-configured UL grant (Type1). If this field is absent the UE uses UL grant configured by DCI addressed to CS-RNTI (Type2). Type 1 configured grant may be configured for UL or SUL, but not for both simultaneously.<br>timeDomainOffset<br>Offset related to SFN = 0, see TS 38.321 [3], clause 5.8.2. |

General

Embodiments of the present invention have been described in detail above, and the respective embodiments and aspects may be implemented individually or two or more of the embodiments may be implemented in combination.

Embodiments of the present invention have been described in detail above with reference to a sidelink communication using the PC5 interface. However, the present invention is not limited to the use of the PC5 interface. Any other interface allowing for a direct communication among one or more UEs may be employed.

In some of the embodiments described above, reference has been made to respective vehicles being either in a mode in which SL resource allocation configuration or assistance is provided by a base station, e.g., the connected mode, also referred to as NR Mode 1 or LTE Mode 3 configuration, or vehicles being in a mode in which when no SL resource allocation configuration or assistance is provided by a base station, e.g., the idle mode, also referred to as NR Mode 2 or LTE Mode 4 configuration. However, the present invention is not limited to V2V communications or V2X communications, rather it is also applicable to any device-to-device communications, for example non-vehicular mobile users or stationary users that perform a sidelink communication, e.g., over the PC5 interface. Also, in such scenarios, e.g., due to moving obstacles, the connection to a bases station may be temporarily interrupted so the UE may be considered also out-of-coverages. The inventive aspects described above may be employed in such scenarios as well.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a receiver, like a UE or a base station, may comprise one or more of a mobile or stationary terminal, an IoT device, a ground-based vehicle, an aerial vehicle, a drone, a building, or any other item or device provided with network connectivity enabling the item/device to communicate using the wireless communication system, like a sensor or actuator. In accordance with embodiments, a transmitter, like a base station or a UE, may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 7:
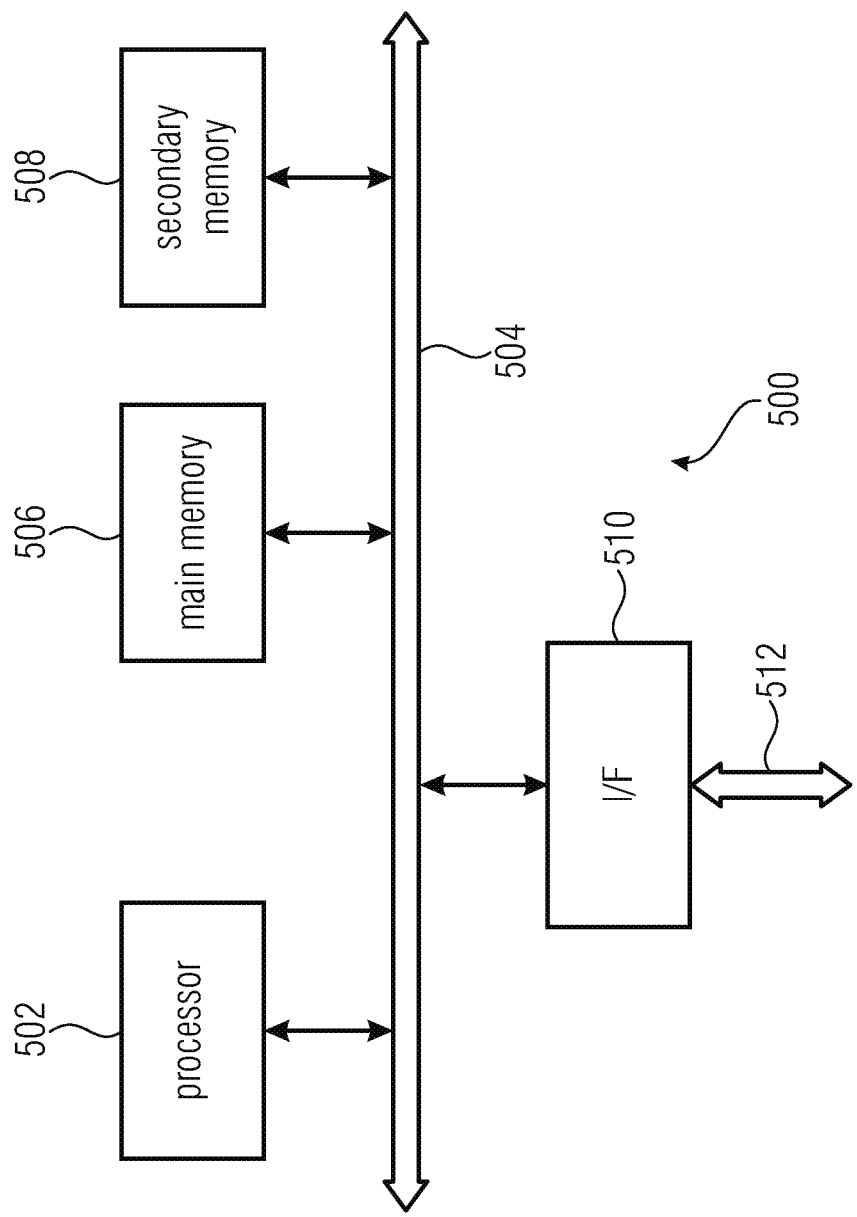
FIG. 7 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 7 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

| Reference | Details |
|---|---|
| [1] | TS36.213 Evolved Universal Terrestrial Radio Access (E-UTRA); Physical layer procedures; V15 |
| [2] | TS 36.331 Evolved Universal Terrestrial Radio Access (E-UTRA) - Radio Resource Control (RRC); V15. |
| [3] | 3GPP TS 36.321 Evolved Universal Terrestrial Radio Access (E-UTRA); Medium Access Control (MAC) protocol specification, v 15 |
| [4] | 3GPP TS 36.321 Evolved Universal Terrestrial Radio Access (E-UTRA); Radio Link Controller (RLC) protocol specification, v 15 |
| [5] | TS 36.521 User Equipment (UE) conformance specification; Radio transmission and reception; Part 1: Conformance testing Rel 15. |
| [6] | TS 38.331 New Radio - Radio Resource Control (RRC); V15. |
| [7] | 3GPP TS 38.321 New Radio; Medium Access Control (MAC) protocol specification, v 15 |

Abbreviations

| Abbreviation | Meaning |
|---|---|
| BS | Base Station |
| CBR | Channel Busy Ratio |
| D2D | Device-to-Device |
| EN | Emergency Notification |
| eNB | Evolved Node B (base station) |
| FDM | Frequency Division Multiplexing |
| GH | Group head |
| GM | Group Member |
| LTE | Long-Term Evolution |
| PC5 | Interface using the Sidelink Channel for D2D communication |
| PPPP | ProSe per packet priority |
| PRB | Physical Resource Block |
| ProSe | Proximity Services |
| RA | Resource Allocation |
| SCI | Sidelink Control Information |
| SL | sidelink |
| sTTI | Short Transmission Time Interval |
| TDM | Time Division Multiplexing |
| TDMA | Time Division Multiple Access |
| TPC | Transmit power control/transmit power command |
| UE | User Entity (User Terminal) |
| URLLC | Ultra-Reliable Low-Latency Communication |
| V2V | Vehicle-to-vehicle |
| V2I | Vehicle-to-infrastructure |
| V2P | Vehicle-to-pedestrian |
| V2N | Vehicle-to-network |

The invention claimed is:

1. A wireless communication system, comprising:
one or more base stations,
one or more user devices, UEs, for a communication with a base station and/or another UE using allocated resources,
wherein, in case the UE gets out of coverage of a serving base station, at least some of the allocated resources of the serving cell are maintained or reserved for a predefined time interval, T,
wherein the wireless communication system is to monitor a radio link between the UE and the serving base station so as to determine a short-term out-of-coverage of the UE, and
wherein, responsive to determining the short-term out-of-coverage, the wireless communication system is to indicate a timer for the allocated resources, wherein the timer indicates the predefined time interval, T, as a certain time period or as a certain number of subframes.

2. The wireless communication system of claim 1, wherein at least some of the allocated resources comprise SL resources, wherein one or more of the following SL resources allocations may be maintained or reserved:
resource pool definitions, or
configured resources, or
other RRC configurations.

3. The wireless communication system of claim 1, wherein the monitoring may comprise one or more of the following measurements:
out-of-sync,
signal strength, like RSSI,
CR errors or Block-Error rate,
radio link fading or failure metrics or measures.

4. The wireless communication system of claim 3, wherein the short-term out-of-coverage is identified in case one or more of the measurement results from the monitoring of the radio link is below a predefined respective threshold, and wherein the respective thresholds may depend on the communication the UE is involved in, e.g., certain requirements to be fulfilled, like a certain quality of service, QoS, comprising for example latency, reliability, and communication range, or a certain casting type, comprising for example unicast, multicast or broadcast, or a certain communication type, comprising for example an initial transmission, a retransmission and a feedback, like HARQ or CSI.

5. The wireless communication system of claim 1, wherein the timer is defined based on one or more of: —a single fixed value configured via signaling or preconfigured in a UE or by a network—more than one value configured via signaling or preconfigured in a UE or by a network—one or more values configured via upper layer signaling, wherein the values convey one or more Quality of Services, QoS, indicator—one or more values measured by the UE, wherein the UE may be requested to perform timing measurements, wherein the timing measurements may imply the different criteria, e.g., speed, route-direction, position, packet priority, QoS.

6. The wireless communication system of claim 1, wherein the timer is provided for a specific UE or for a group of UEs.

7. The wireless communication system of claim 1, wherein the predefined time interval, T, of the timer is selected to
avoid the UE being considered out-of-coverage, e.g., by upper layers, immediately responsive to determining the short-term out-of-coverage, thereby avoiding a dumping of the allocated resources, and/or
allow the UE to complete a handover procedure, and/or
allow the UE to stay connected while performing a handover, HO, or when a HO stays for a timer (longer timer) not successful.

8. The wireless communication system of claim 1, wherein the timer is terminated before the predefined time interval, T, is reached responsive to the UE
joining a new cell/base station and receiving a RRC configuration from the new cell/base station, e.g., responsive to a successful handover, or
joining back to the serving cell/base station and receiving a RRC reconfiguration.

9. The wireless communication system of claim 1, wherein the wireless communication system is to start the timer responsive to one or more of the following:
an out-of-coverage determination in the serving cell frequency list,
an out-of-coverage determination in a neighboring cell list,
the UE initiating a UE assisted handover,
the UE started a base station assisted handover, and
the UE being in Mode 2 and determining that no sensing results are available,
the UE being in Mode 1 and changing to Mode 2.

10. The wireless communication system of claim 1, wherein, in case the timer is indicated to the UE so as to maintain RRC/configurations during the short-term out-of-coverage,
if the timer is for out-of-coverage, then the timer may be longer than RLF,
if the UE is doing Handover, then the timer may be longer than HO timers.

11. The wireless communication system of claim 1, wherein in case of the UE switching from Mode 1 to Mode 2 due to a Radio Link Failure, RLF, the timer starts prior to the RLF and continues beyond the RLF.

12. The wireless communication system of claim 1, wherein the allocated resources are resources for configured grants, wherein the configured grants may comprise RRC configured grants without any L1 signaling, RRC Type 1, or RRC configured grants with an L1 signaling for activation or deactivation, RRC Type 2.

13. The wireless communication system of claim 12, wherein
the configured grants comprise one or more of the following:
configured grants for TX resource pools used for specific UEs,
common configured grant resources used by a group UEs, configured with a group common signaling
common configured grant resources used by all UEs, or
wherein the configured grant resources may be configured via RRC and/or DCI signaling to be operating in:
exceptional pools used during radio failure and other radio exceptional conditions,
UL resources if the UE is allowed to perform SL communication over Uu configured resources,
X/flexible/S resources or slots if the UE is allowed to perform SL communication over Uu configured resources,
DL resources if the UE is allowed to perform SL communication over Uu configured resources,
SPS configuration configured to UE by an LTE device.

14. The wireless communication system of claim 1, wherein for a transmission on the configured grants during the predefined time interval, T, the timer is to preserve a periodicity P of one or more configured grants.

15. The wireless communication system of claim 14, wherein the timer is to preserve the periodicity P by referring to one or more of the following:
only the configured time-offset synchronized to last detected SFN,
the configured time-offset and a correction from a GNSS, from source UE(s) or from another cell, and
if indicated by an RRC messages or an upper layer, an arbitrary selected time-offset to an arbitrary selected SFN, wherein the UE is to send an appropriate PSSS as a synchronization source for the serving base station.

16. A base station for a wireless communication system, the wireless communication system comprising one or more base stations and one or more user devices, UEs, for a communication with a base station and/or another UE using allocated resources, the base station comprising:
one or more antennas or an antenna array having a plurality of antenna elements, and
a transceiver,
wherein, in case the UE gets out-of-coverage of the base station, the base station is to maintain or reserve at least some of the allocated resources for a predefined time interval, T,
wherein a radio link between the UE and the base station is monitored so as to determine a short-term out-of-coverage of the UE, and
wherein, responsive to determining the short-term out-of-coverage, the base station is to indicate to the UE a timer for the allocated resources, wherein the timer indicates the predefined time interval, T, as a certain time period or as a certain number of subframes.

17. A user device, UE, for a wireless communication system, the wireless communication system comprising one or more base stations and one or more user devices, UEs, the UE comprising:
one or more antennas or an antenna array having a plurality of antenna elements, and
a transceiver,
wherein the UE is to communicate with a base station and/or another UE using allocated resources,
wherein, in case the UE gets out-of-coverage of its serving base station, at least some the allocated resources of the serving base station are maintained or reserved for a predefined time interval, T,
wherein a radio link between the UE and the serving base station is monitored so as to determine a short-term out-of-coverage of the UE, and
wherein, responsive to determining the short-term out-of-coverage, the UE is to receive a timer for the allocated resources, wherein the timer indicates the predefined time interval, T, as a certain time period or as a certain number of subframes.

18. A method for operating a wireless communication system, the wireless communication system comprising one or more base stations and one or more user devices, UEs, for a communication with a base station and/or another UE using allocated resources, the method comprising:
in case the UE gets out-of-coverage of a serving base station, maintaining or reserving at least some of the allocated resources of the serving cell for a predefined time interval, T,
monitoring a radio link between the UE and the serving base station so as to determine a short-term out-of-coverage of the UE, and
responsive to determining the short-term out-of-coverage, indicating a timer for the allocated resources, wherein the timer indicates the predefined time interval, T, as a certain time period or as a certain number of subframes.

19. A non-transitory computer program product comprising a computer-readable medium storing instructions which, when executed on a computer, perform a method for operating a wireless communication system, the wireless communication system comprising one or more base stations and one or more user devices, UEs, for a communication with a base station and/or another UE using allocated resources, the method comprising:
in case the UE gets out-of-coverage of a serving base station, maintaining or reserving at least some of the allocated resources of the serving cell for a predefined time interval, T,
monitoring a radio link between the UE and the serving base station so as to determine a short-term out-of-coverage of the UE, and
responsive to determining the short-term out-of-coverage, indicating a timer for the allocated resources, wherein the timer indicates the predefined time interval, T, as a certain time period or as a certain number of subframes.

* * * * *